(12) United States Patent
Han

(10) Patent No.: US 10,982,645 B2
(45) Date of Patent: Apr. 20, 2021

(54) RIVER AND TIDAL TURBINE WITH POWER CONTROL

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 131 days.

(21) Appl. No.: 16/134,595

(22) Filed: Sep. 18, 2018

(65) Prior Publication Data

US 2019/0048845 A1 Feb. 14, 2019

Related U.S. Application Data

(63) Continuation-in-part of application No. 15/883,927, filed on Jan. 30, 2018, now Pat. No. 10,670,116, (Continued)

(51) Int. Cl.
*F03B 13/26* (2006.01)
*F03B 15/12* (2006.01)
(Continued)

(52) U.S. Cl.
CPC ............ *F03B 13/264* (2013.01); *F03B 15/12* (2013.01); *F03B 17/061* (2013.01); *F03B 17/063* (2013.01); *F03D 9/25* (2016.05); *F03D 15/00* (2016.05); *F03D 15/10* (2016.05); *F03D 17/00* (2016.05); *F16H 3/06* (2013.01); *F16H 3/724* (2013.01); *F03D 3/0454* (2013.01); *F03D 3/0472* (2013.01); *F05B 2240/12* (2013.01); *F05B 2240/93* (2013.01);
(Continued)

(58) Field of Classification Search
CPC ........ F03B 13/264; F03B 17/061; F03D 9/25; F03D 15/00; F03D 17/00
See application file for complete search history.

(56) References Cited

U.S. PATENT DOCUMENTS 8,338,481 B2 12/2012 Kloog et al.
8,485,933 B2 7/2013 Han
(Continued)

*Primary Examiner* — Derek D Knight
(74) *Attorney, Agent, or Firm* — Cameron LLP

(57) ABSTRACT

A river or tidal turbine for generating a minimum predetermined value of electricity from river current received at a harnessing module comprises a harnessing module, a control module and a generating module. Han's principle is that harnessed power from a river or tidal turbine must exceed a predetermined value of control power used by the turbine. Minimum power is lost in a three variable closed mechanical control system. The three variable closed mechanical system comprises a Hummingbird control assembly of first and second spur/helical gear assemblies which may be preferably mechanically simplified. The Hummingbird control, a control motor and a generator among other components may be mounted on a floating platform for delivery of constant power at constant frequency given sufficient input from a waterwheel harnessing module driven by river current flow in at least one direction. A tidal embodiment may comprise a moveable hatch for permitting the waterwheel to turn in foe same rotational direction regardless of direction of water current flow.

17 Claims, 22 Drawing Sheets

Layout of Two Transgear Hummingbird

Related U.S. Application Data which is a continuation-in-part of application No. 15/267,655, filed on Sep. 16, 2016, now Pat. No. 9,912,209, which is a continuation-in-part of application No. 14/838,867, filed on Aug. 28, 2015, now Pat. No. 9,476,401, said application No. 15/883,927 is a continuation-in-part of application No. 15/707,138, filed on Sep. 18, 2017, now Pat. No. 10,378,506.

(60) Provisional application No. 62/409,549, filed on Oct. 18, 2016, provisional application No. 62/487,101, filed on Apr. 19, 2017, provisional application No. 62/520,884, filed on Jun. 16, 2017.

(51) Int. Cl.
| | | |
|---|---|---|
| *F03B 17/06* | (2006.01) | |
| *F03D 15/10* | (2016.01) | |
| *F03D 17/00* | (2016.01) | |
| *F03D 9/25* | (2016.01) | |
| *F16H 3/06* | (2006.01) | |
| *F16H 3/72* | (2006.01) | |
| *F03D 15/00* | (2016.01) | |
| *F03D 3/04* | (2006.01) | |

(52) U.S. Cl.
CPC ..... *F05B 2240/97* (2013.01); *F05B 2260/402* (2013.01); *F05B 2260/40311* (2013.01); *F05B 2260/42* (2013.01)

(56) References Cited

U.S. PATENT DOCUMENTS

| | | | |
|---|---|---|---|
| 8,702,552 B2 * | 4/2014 | Han | F03B 3/18 475/204 |
| 8,986,149 B2 | 3/2015 | Han | |
| 8,992,370 B2 | 3/2015 | Han | |
| 9,151,269 B2 | 10/2015 | Han | |
| 9,169,772 B2 | 10/2015 | Han | |

* cited by examiner

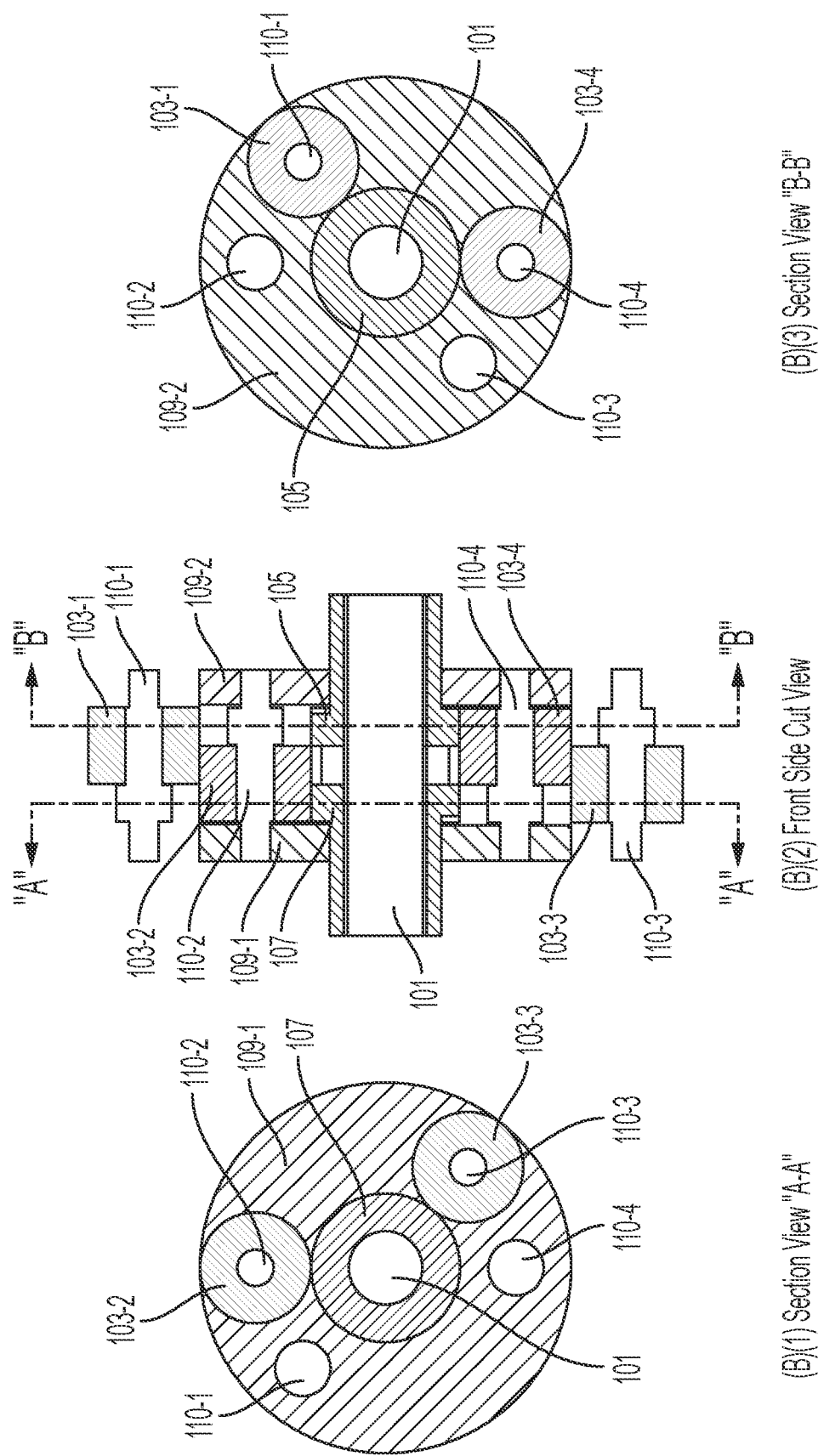

hummingbird Simplified hummingbird Simplified

Layout of rpm Balanced Hummingbird

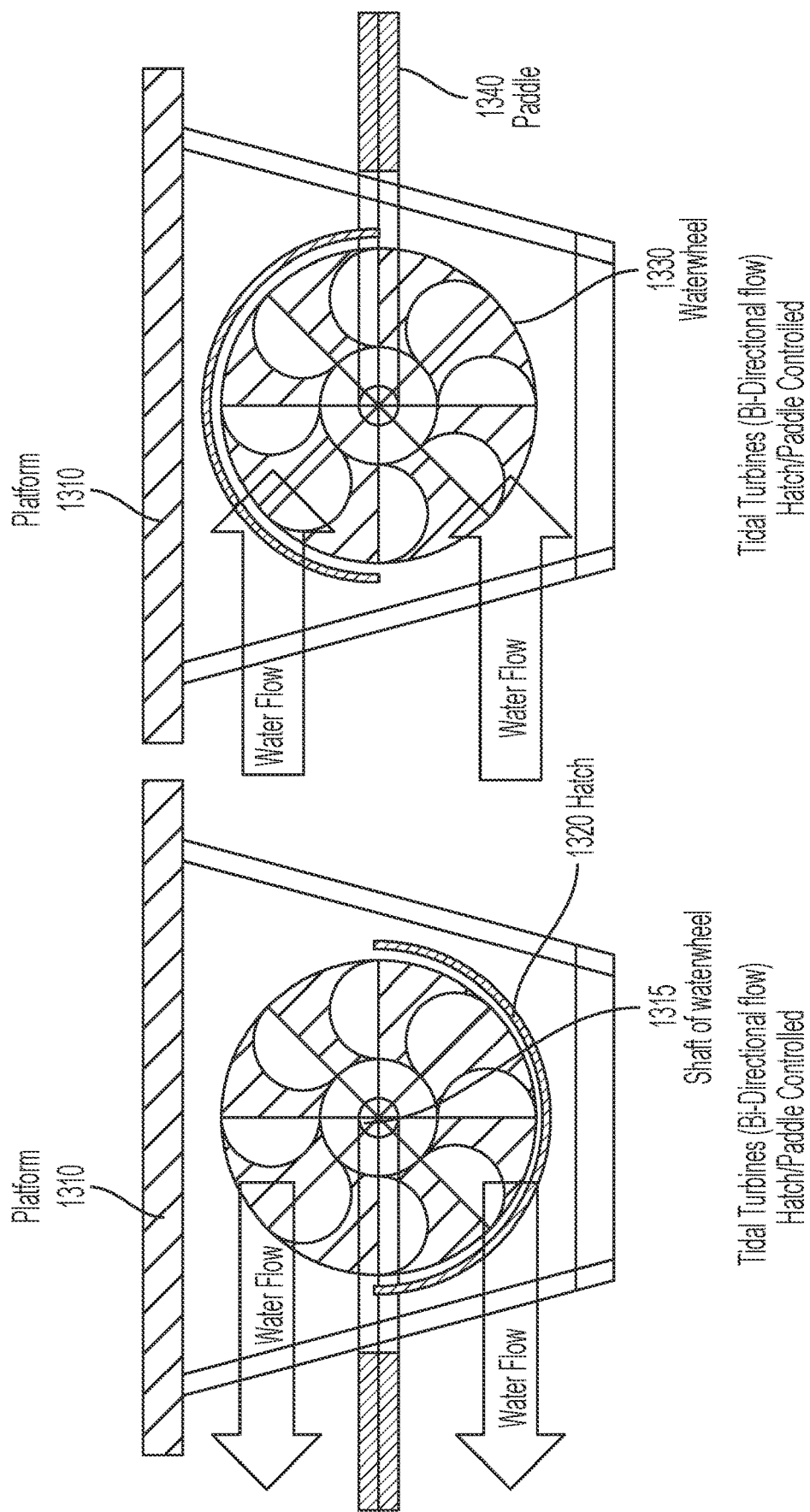

RIVER AND TIDAL TURBINE WITH POWER CONTROL

This application is a continuation-in-part of U.S. patent application Ser. No. 15/883,927 filed Jan. 30, 2018, which is a continuation-in-part of U.S. patent application Ser. No. 15/267,655, filed Sep. 16, 2016, (now U.S. Pat. No. 9,912,209) which is a continuation-in-part of U.S. patent application Ser. No. 14/838,867 (now U.S. Pat. No. 9,476,401) filed on Aug. 28, 2015, and is also a continuation-in-part of U.S. patent application Ser. No. 15/707,138 filed on Sep. 18, 2017, entitled "Commutator-less and Brush-less Direct Current Generator and Applications for Generating Power to an Electric Power System" which claims the right of priority to U.S. Provisional Patent Application Ser. No. 62/409,549 filed Oct. 18, 2016 of the same title and inventor, and U.S. patent application Ser. No. 15/883,927 claims the benefit of priority to U.S. Provisional Patent Application Ser. No. 62/487,101 filed Apr. 26, 2017 and to U.S. Provisional Patent Application Ser. No. 62/520,884 filed Jun. 16, 2017, all patent applications of the same inventor and incorporated by reference in their entirety.

TECHNICAL FIELD

The technical field of the invention relates to providing a method and apparatus for controlling the harnessing of renewable energy to a constant power value and constant frequency with a marine hydrokinetic (MHK) river or tidal turbine or other renewable energy producing source and for controlling other apparatus. The turbine comprises three components: a harnessing module, a controlling module and a generating module. Two three variable Transgear™ gear assemblies are assembled in various configurations as a so-called Hummingbird™ controlling module, for example, such that two spur/helical gear Transgear™ gear assemblies having an input, an output, and a control comprising a control motor for converting variable renewable input energy (particularly river and tidal water energy) into renewable energy having a constant rotational speed output, constant voltage and constant current for generating an electrical output of constant frequency (fifty Hertz European or sixty Hertz U.S.), for example, twenty-five kilowatts. The river or tidal turbine may be used in river or tidal estuary applications having a harnessing module designed for a particular location on the river or tidal estuary sufficient to supply at least twenty-five kW of power for operating the turbine.

BACKGROUND OF THE INVENTION

Hydroelectric and wind energy are two major sources of so-called renewable energy. In the U.S.A. in 2015 (EIA), 33.3% or one-third of all electric energy is produced by steam generation using coal. A third source of renewable energy comes from the sun (only 0.6%) and a first source comes from water (hydro amounts to 6.0% according to the EIA). Water flows at variable speed and so does wind. The sun only is bright enough during daytime hours for conversion to electrical energy. An advantage of water flow is the mass/density, inertia or power that may be generated by the flow of water compared with the flow of wind (wind amounts to 4.7%) where wind must be harnessed by huge wind-driven propellers or rotor blades. Also, for example, river water typically flows at all hours of the day at a relatively constant rate of flow.

Natural gas provides, in the same year, about 32.8% of U.S. electric energy, and nuclear energy now provides about 19.6%, for example, via steam turbine generation. Petroleum, such as oil, is used to produce only about 1% of U.S. electric energy. Coal, natural gas, biomass (1.6%) and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic, MHK, energy via river or tidal turbine) sources. The great Coulee dam, Hoover dam and the Tennessee Valley Authority are exemplary of projects started in the early $20^{th}$ century in the United States for generating hydroelectric power, but these require large dams to build potential energy for turning electric turbine generators. Large hydroelectric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created takes provide water control and recreational use for boating, fishing and the like. Nevertheless, there remains a need for a water driven electricity generator and control that may save the cost of building a dam, permit the marine hydrokinetic (MHK) generation of electricity and use the high inertia flow of a river or tidal estuary flow of ocean currents and tides to produce constant power. And, notwithstanding the variable nature of renewable sources of energy, there is a need for a control system for assuring constant frequency power at constant frequency, voltage and current so as to be a dependable source for small villages, for example, in developing nations of Africa find other continents and to conform to world standards.

So-called biomass energy generated from plant and animal material (waste) may amount to 1.6% of total renewable energy but has similar problems to those of non-renewable carbon-based systems and can cause emissions. While hydroelectric energy amounts to the next greatest renewable source at about 6.0%, it is believed that more can be done to efficiently utilize the rivers and tides of ocean currents in the United States and in developing nations, for example, in Africa than by hindering the flow of water commerce by the construction of dams.

Other renewable sources include geothermal, wind and solar energy. While these are "clean" sources, to date, their growth has been unimpressive. Only wind energy is supported by the Department of Energy, and wind energy is forecast to grow from 4.7% in 2015 to 20% of all US energy in approximately 20 years. Recently, offshore wind turbines have been considered for use off the Eastern Shore of the United States mounted on platforms for generating power for the mainland coastal states.

A mechanical meshed gear gearbox is known to have a failure rate of approximately 5%. Electronics used in a turbine have the highest potential failure rate of 26%. Control units generally exhibit a failure rate of 11%. Sensors exhibit approximately a 10% failure rate. The failure rate of a variable frequency converter or variable power converter may be on the order of 26% (electronics) according to an ongoing consortium's study of drive train dynamics at the University of Strathclyde, Glasgow, Scotland. According to published information, the mean time between failures of a 1.5 mega Watt turbine, for example, may be only two years on average (but the real failure rate is an industrial secret); and the replacement cost may be over $50,000 (for example, $50,000 to $100,000 US) per variable frequency converter. A failure rate of the variable speed generator of a known turbine is on the order of 4.5%. Consequently, problems related to known wind, water (river and tidal) turbines relate closely to the failure rate of gearboxes, generators, variable frequency converters or variable power converters and associated electronics and inefficiencies of operation.

A solution to the identified problems is to provide a constant rotational velocity as an input to the constant speed electric generator so that an electricity generator in turn can produce a constant frequency output and deliver a constant voltage and constant current (power) directly to an electric grid. Transmissions or speed converters, for example, have been developed or are tinder development by the following entities: IQWind, Fall brook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

A recent development in the an of gearboxes is a magnetic gear which relies on permanent magnets and avoids meshed gears. Magnetic gears, for example, developed by and available from Magnomatics, Sheffield, UK, have an air gap between sheath and shaft and so there is no meshing of gears in a gearbox. Alternating north and south poled permanent magnets may slip with a burst of water energy with a magnetic gear hut break a meshed gear gearbox. A magnetic gear yields when a large burst of water energy or a tidal or wave burst of water energy turns a gearbox input while a meshed gear may break or cause considerable wear to a meshed gear of the gearbox.

Known marine hydrokinetic (MHK) turbines such as run-of-the-river, tidal, and hydrokinetic river turbines have problems. There is the problem of having to convert a harnessed variable frequency to a constant frequency and dependable constant power output. On the other hand, there are many advantages for harnessing marine hydrokinetic (MHK) energy: the density (mass or inertia) of water is much greater than that of wind and its speed is not as variable as wind speed especially when used in a relatively constant flowing river or steam which flows continuously in the same direction (such as the Mississippi River of the United States). Tides are reversible (high tide to low tide flowing toward the ocean and low tide to high tide flowing in from the ocean) and associated known turbines may be limited to generating power in one direction of water flow (during changing high to low tide or low to high) and generate maximum power at only two times during a day and so resultant output power is sinusoidal in nature (flowing in to a maximum and then reversing and flowing out to a maximum).

A concept for improving turbines is use of a direct drive in which a rotor and a shall drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, for example, use power converters or frequency converters and so result in reduced down time for gearbox repairs at the expense of increased cost due to the bigger generators. A speed converter to convert variable speed to constant speed is disclosed in U.S. Pat. No. 8,388,481 of Kyung Soo Han, incorporated by reference as to its entire contents. The speed converter is entirely mechanical and so scalable and improves upon the high failure rate, reliability and efficiency of known electrical/mechanical systems. Speed converters under development are also frequency converters and are shown in this and other patent applications and patents of Key Han and are referred to as infinitely variable speed converters or simply speed converters.

Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of U.S. Pat. No. 8,641,570 of Differential Dynamics Corp. (also known as DDMotion), also incorporated by reference as to its entire contents. The DDMotion speed converters are differentiated from those of Torotrak and Fallbrook by their gear drives (no toroids, pulleys or belts) and that they are scalable.

A turbine was produced by Hydrovolts, Inc. The apparatus may comprise a waterwheel and may comprise a gear and belt drive inside which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U.S. Published Patent Application 2010/0237626 of Hammer published Sep. 23, 2010, which appears to comprise a waterwheel construction. Hydrovolts' rotating (hinged) blades may control some of the water flow speed, but it is urged that the exposed rotating blades may be susceptible to damage.

A river turbine is known which may be attributed to Free Flow Power Corp. and may have been lowered to the bottom of the Mississippi River or attached to a piling. It is believed that such a device may be very similar to a turbine engine of an airplane but below water level and the water, at velocity, drives a turbine propeller (blades). Due to lowering prices of natural gas, the project became economically unviable (according to their press release in 2012).

New Energy Corp. Inc. of Calgary, AB, Canada in collaboration with the present inventor and DDMotion has recently announced a hydrokinetic turbine that may operate at five kilowatts. These are anticipated to be turbines on floating platforms that will come in sizes from five kilowatts to one hundred kilowatts, preferably 25 kilowatts. An installation of a twenty-five kilowatt EnviroGen plant is planned for use by the First Nation communities on the Winnipeg River, requires no dams and may be anchored in the river, on the river bottom or another appropriate location. The plant is expected to require no fuel, run twenty-four hours a day from river currents, and there may be no need for a large battery bank. The energy harnessing module may comprise propellers or waterwheels that appear to be vertical to face the river water flow of approximately 2.4 meters per second at some locations or over three meters per second at other locations.

It is generally known in the art to utilize devices that look much like wind turbines to capture water energy. A tidal and/or river current turbine is known from FIG. 1 of U.S. Pub. Patent App. 2009/0041584 published Feb. 12, 2009 The diagram provides live labels, showing direction of water flow "A" (from right to left). Note that the turbine rotates on a pole so that rotor blade 150 captures the water as it passes. This device may be available from Verdant Power. It is respectfully submitted that Verdant Power may currently be strengthening their blades and adding pitch control.

A rotating ring device including a rotating ring is known which is available from Oceana Energy Company. FIG. 1 of U.S. Published Patent Application 2012/0211990 of Aug. 23, 2012 of Oceana Energy allegedly comprises hydrofoils both external and internal to the rotating ring.

Perhaps the roost like a wind turbine in appearance is the known tidal energy turbine of ScottishPower Renewables, a division of Iberdrola. According to press releases, this tidal device with its propeller (rotor blades) is capable of generating approximately 10 MW of power as an "array" perhaps of twelve or more such devices at less than 1 MW each.

Most maps of the United States show the major rivers which include the Ohio, the Mississippi, the Missouri, the Snake River and the Pecos and Brazos Rivers of Texas. As can be seen from such a map, there is a great potential to harness the water energy of these rivers in the United States and to power, for example, the entire area covered by the Mississippi River and its tributaries including the Missouri, the Platte and the Red Rivers. Using dams across these rivers to generate electricity would be costly and hinder river traffic and marine lives. It may be that only Free Flow Power has developed a device for use on such a river as the Mississippi, (but Free Flow Power abandoned the Mississippi project in 2012).

Similarly, a map of the world shows the major rivers of the world, further highlighting foe potential to harness water energy in rivers world-wide. (Predictable ocean tides cause water to flow upstream in ocean tributaries at low to high tide transitions and downstream in ocean tributaries at low tide and may be more widely used for electric power generation.)

A typical hydroelectric power plant is mounted within a dam of a river. A first step in harnessing water energy in this means is to build the dam to create a pressure head that is proportional to the depth of the water backed up by the dam. The backed-up water is represented by a reservoir or lake. At the base of the dam, there may be intake gates which allow water that has been compressed by the head to flow through a penstock to a powerhouse which is one of many such powerhouses that may be constructed along the width of a large dam. One powerhouse may comprise a generator and a turbine which outputs electric power to long distance power lines. Once the water passes through the turbine, it is returned to the river downstream.

A variable torque generator (VTG) (called a VPG when varying power output) has been described in U.S. Pat. Nos. 8,338,481; 8,485,933; and 8,702,552 as well as PCT/US2010/042519 published as WO2011/011358 of Key Han, incorporated by reference as to their entire contents. The variable torque or variable overlap generator (VOG) has one of an axially moveable rotor and/or stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another. When used in a power generating module to regulate flow of power, foe VTG is referred to as a variable power generator or VPG. When used in a torque generator and a power generator to regulate torque and flow of power, the generator is referred to as a variable torque and power generator or VT&PG. Torque and/or power are at a maximum when there is a maximum rotor/stator overlap.

In particular, there is described in, for example, WO2011/011358 or U.S. Pat. No. 8,338,481 (the U.S., '481 patent), the concept of measuring torque/rpm on an output shaft of a system such as a river/tidal/ocean wave/ocean current turbine (which may be referred to herein as a marine hydrokinetic (MHK) turbine) for providing a constant output from a variable flow input. The measured torque rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase with increasing wind or water flow and vice versa. This variable torque generator (VTG) process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

DDMotion has proposed a variable to constant speed generator including the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. The rotor and stator of foe variable power generator are shown such that the rotor may be directly coupled to the shaft. Per FIG. 13 of the '481 patent. "When the stator parts 1330(a) and 1330(b) are moved away from rotor 1310. a minimum input torque results. The operation of a control may be as follows via measuring a torque value stored in memory proximate to the maximum torque that a given rotor shaft 1320 may receive (a maximum allowable torque value), the stator parts 1330(a) and 1330(b) may be moved by a motor (not shown) to be in removed torque position or a position in between maximum and minimum torque positions whereby a close-to-maximum torque position may be achieved in relation to the measured torque and the maximum allowable torque(/rpm) value or value stored in memory."

Most of today's water/electric conversion is directed to hydroelectric dams, tidal influences and small rivers or canals. According to www.mecometer.com, the potential for development of electricity for large rivers is on the order of over one million megawatts in the USA. Also, the capacity for generating electricity using rivers in China is 1.1 million megawatts and foal of the entire world over five million megawatts. So, river and tidal water turbines are not only economically viable, they represent viable renewable energy sources for powering the world without hydrocarbons, high cost and with low maintenance.

Consequently, there remains a need in the art to provide applications of a harnessing module, a control module and a power generating module to provide a constant value of power. Such a generating module as a variable torque and power generator (VT&PG) assembly as well as a controlling module comprising two three variable spur/helical gear assemblies (Transgear™ gear assembly) called a Hummingbird™ gear assembly or a Goldfinch™ assembly and a constant speed motor in connection with the generation of electrical energy/power (variable torque and power generator, VT&PG) from renewable sources such as river/ocean current and tidal devices, that is, a marine hydrokinetic river or tidal turbine electric power generator among other possible applications for generating electric power at constant alternating current frequency and voltage for an electric power grid for a small community (for example, in developing countries) or small industrial plant (for example, 25 kw constant power capacity) or for powering the entire Mississippi river basin (several MHK turbines placed periodically along the length of the entire Mississippi river). A river turbine may be designed to comprise a hydrokinetic river turbine that may, for example, comprise a specially designed harnessing module, a control module and a constant power generating module for controlling the output power generated to a constant level, for example, twenty-five kW and at 50 or 60 Hz.

SUMMARY OF THE PREFERRED EMBODIMENTS

Embodiments of control systems for renewable energy electric power generation at constant frequency may involve the combination of first and second spur/helical gear assemblies called Transgear™ gear assemblies as a Hummingbird control module, the Hummingbird control having a constant speed control motor, the Hummingbird control for converting variable rotational speed input to constant electrical frequency. A harnessing module may be a waterwheel or other module designed to harness energy and in particular, torque, at a approximately constant rotational speed or $\omega$ to generate $\omega\tau$ of energy. It is a principle of the present invention that $\tau$ (Harnessing Module)=>$\tau$ (Controlling Module)=$\tau$ (Generating Module) since some $\Delta\tau$ (Harnessing Module) or $\Delta$rpm (Harnessing Module) shall be released if the water speed and generated torque for driving the controlling and generating modules may be released to achieve a constant, for example, twenty-five kilowatt output to an electric grid.

A further principle of the present invention is that of achieving constant torque in a balanced three variable system (input, output and control) such that $\tau$=Energy/$\omega$ (rotational speed of output or generated electrical frequency). By balancing torque $\tau$ in a closed Hummingbird control system, one may be able to use a constant rotational speed motor utilizing only about a tenth of the harnessed water flow energy (a relatively small control energy input compared with the energy that is harnessed or generated) to generate a constant, for example, twenty-five kilowatts of renewable energy.

In one embodiment, to reduce a requirement for generating power to run a constant speed generator at constant power, a conventional direct current generator may be used to generate power for running the constant speed motor and other purposes which can be powered by storage batteries storing excess generated DC power. Priority U.S. patent application Ser. No. 15/707,138 filed Sep. 18, 2017, suggests a commutator-less and brush-less direct current generator that is more efficient than known DC generators.

Conventional or recent designs of a direct ore alternating current motor for providing a constant rotational velocity to a control module may have an output to regulate a Transgear spur/helical gear assembly or assemblies referred to herein as a Hummingbird™ variable to constant speed control apparatus driven by a specially designed renewable energy harnessing module for a particular river or tidal estuary application so as to not require much power to be drained from an electric grid or from the generated power to operate the constant frequency alternating or direct current generator at constant rotational speed $\omega$.

A suggested application also may include application of a conventional generator or a known variable torque and power generator (VT&PG) sometimes referred to as a Variable Overlap Generator (VOG) or variable power generator (VPG) for converting variable rotational speed to constant electric power grid alternating power frequency.

The controlling module comprising a controlled or constant speed motor useful, for example, in wind and river/tidal/ocean wave/ocean current (MHK) turbines along with the use of spur/helical gear assemblies of sun gears, sets of planetary gears and carrier gears and brackets referred to herein as Transgear™ gear assemblies or simply Transgear or Hummingbird three variable control modules may be a known direct current constant speed motor or alternating current constant speed control motor or both. Hatch control of a waterwheel or propeller (harnessing module) or other known renewable energy harnessing module (water) or pitch (wind) control may be needed in tidal estuaries.

A river turbine (river flow being relatively constant in one direction) or a tidal turbine (river flow direction changing with the tides) may comprise a harnessing module, a control module and a generating module. It is suggested herein to measure waterwheel rotational speeds and developed torque over a period of a month or more at a specific river location (for example, where the current is swift and the depth of the river is greater than, for example, four feet,) with a generator load (for example, twenty-five kilowatts) in order to design a harnessing module, control module, generating module closed system that may balance torque and variable speed sufficient to turn a generator so as to produce a constant value of power, for example, twenty-five kilowatts. As will be described herein, location on a given river having a narrow or wide width or greater depth than a rocky stream may impede the power output and so the system including the harnessing module must be carefully designed. There are described herein a paddle wheel with buckets and a hatch which permits water to drive the waterwheel in two directions (tidal flow) by reversing the hatch or using trap doors and protector bars. Other designs of a waterwheel or propeller or other harnessing modules described above may be used if designed properly following the principles of the present invention including propeller, a pitched blade waterwheel and the like. Such a value of power from a harnessing module at constant frequency may power an entire village proximate to a river or tidal estuary. As introduced above, a harnessing module may have a hatch for rotating 180 degrees for converting tidal flow in two directions, but the waterwheel turns in one rotational direction. An input shaft from a gear box via a harnessing module may turn a Hummingbird speed control system having a constant speed control motor system and a generating module for delivering renewable energy captured by the harnessing module to a generator load or an electric power grid.

The gears of a so-called Hummingbird speed control system may be buffered to a harnessing module by a known magnetic gearbox assembly available from Magnomatics Limited of Sheffield, UK. The magnetic gear assembly permits slippage between gears of a magnetic gearbox so that a gust of wind or sudden increase in water flow velocity will not damage gears of a gearbox or require the use of a clutch. A gear box or a magnetic gear assembly may be replaced by direct connection to the Hummingbird via a torque meter and a tachometer (rotational speed meter) which, in turn may be used to assure a constant output power at the river turbine output.

In river and tidal MHK turbines, a mechanical speed or frequency converter (the Hummingbird) may be used for the purposes of adjusting the harnessed rotational speed of the input which may be slow or fast depending on the rate of river flow or bi-directional tidal flow velocity and desired load value in kilowatts (or larger) with respect to a desired constant output speed (rotational velocity or electric power frequency) for generating renewable electric power to be fed to an electric power grid. A harnessing module may be designed to operate in both directions of tidal current flow for, for example, sixteen hours of a day at 25 kilowatts, four hours a day at 10 kilowatts and store excess generated power in a battery power system for use to provide 25 kilowatts during the eight hours of insufficient delivered power.

An embodiment of a variable speed converter has been constructed and samples are considered having three variables and different "Hummingbird" varieties of simpler and more complex forms constructed and tested. These Hummingbird control varieties of variable to constant frequency and voltage control all provide mechanical synchronization of variable input to constant output and efficient mechanical control of speed, for example, operating at a multiple of 50 Hz (European) or 60 Hz (US) to generate constant voltage and constant power at constant alternating current frequency and the like.

As the three-variable spur/helical gear assembly called a Transgear gear assembly has developed over time from a Goldfinch control system to a first Hummingbird version described in priority U.S. patent application Ser. No. 15/267,655 filed Sep. 16, 2016, after simplification, may comprise two spur/helical gear assemblies combined and share a common shaft coupled to a renewable energy harnessing module with variable speed rotation. The two Hummingbird Transgear assemblies may be reduced in complexity to a single mechanical assembly with few moving parts as samples have been constructed and simplified. It is important to note that since a speed converter converts variable speed to constant speed and converts constant speed to constant frequency, DDMotion's speed converters may be called a mechanical frequency converter or a "rotary frequency converter" as is called in the industry to differentiate from an electronically controlled variable power converter or variable frequency converter (VFC) or variable frequency drive (VFD) which are less efficient and may break down easily.

In particular, in MHK river and tidal turbines, it is suggested that a known generator or a variable overlap generator comprise an adjustment of the relative phase angular (radial) relationship between the rotor and stator in addition to the concept of adjusting the (axial) position lengthwise of a moveable rotor or stator in a variable torque and power generator (VT&PG) for variable torque and power or variable overlap generator (VOG) with variable input velocity (typically rotational speed) and desired output electric frequency and voltage. This concept is especially useful for mechanical speed converters for synching the phase angle of variable input with, for example, a desired constant output velocity (convertible to electric power frequency, for example, at 60 Hz US and 50 Hz European) and constant voltage (but variable current depending on the wind/water velocity).

A further practical application of VT&PG is to provide a reciprocating input to a fixed torque and power generator (FT&PG) sometimes referred to as a fixed overlap generator (FOG) for generating electricity with a reciprocating rotor. This concept eliminates a process of converting erratic motion of ocean wave energy, for example, to a rotary motion before generating electricity and may eliminate the need for Sprags from the speed converter(s) described in prior patent applications and patents of the present inventor, and reduces cost, weight size, and potential validation time. For the purpose of increasing the harnessed speed of reciprocating input or preventing the mechanical gearbox damage due to the sudden surge of power of reciprocating input, using magnetic gears or electromagnetic coupling instead of toothed gears may improve the durability of a gearbox connected to the harnessing module without damaging the gears. The magnetic gears of a magnetic gearbox (having no teeth) may intentionally slip (rather than break) in the event of a strong gust of wind or a strong water flow until a predetermined level of torque between magnetic gears is reached at which point the magnetic gears magnetically mesh with one another and do run slip (unless there is another strong gust of wind or strong surge of water flow).

A further practical application of VT&PG is to use a VT&PG as a reactive speed controller by adjusting the torque or varying the load so that the waterwheel speed may be increased or decreased in a river/tidal/ocean wave/ocean current, marine hydrokinetic (MHK) turbine. In this embodiment, the VT&PG may increase or decrease torque by axially moving the rotor and stator relative to each other in MHK or wind turbines (or any variable load) for control of a waterwheel (or propeller/blades) or Hatch of such a MHK turbine. In an MHK turbine, the reactive torque control may be applied to control waterwheel speed until reactive control reaches a designed maximum and then Hatch control may be used for further waterwheel speed control with respect to desired output electrical power frequency and amount of current generated. A VT&PG may accept rotating or reciprocating tidal turbine input because the input change may vary positively or negatively from a reference value from an erratic energy source, for example, and may provide reactive control because the waterwheel reacts quickly to a load (or to a brake).

A variable torque and power generator (VT&PG) useful in all embodiments for controlling torque/rpm/power from a maximum to a minimum is shown in perspective view in FIGS. 3A, 3B and in a practical application in FIG. 5 of the priority '655 patent application, the figures showing rotor and stator coupled magnetically or electromagnetically for minimum and maximum overlap. (There may be an infinite number of positions between minimum overlap and maximum overlap in a VT&PG but minimum and maximum overlap positions are shown by way of example). The utilization of a variable torque and power generator (VT&PG) as shown in FIGS. 3A and 3B has been validated by the University of Maryland, Baltimore County, as a useful control device for controlling the torque, rotational speed, and power. When the available input torque at the cut-in speed is below the specified value to generate electricity, the VT&PG torque may be reduced, and when the provided input power is more than the specified rated power, the rated power of the VT&PG may be increased. In this case the power rating of the VT&PG has to be higher than the FT&PG (Fixed T&P Generator). Another way of using the embodiment is by adjusting the torque, the rotational speed of the harnessing device, a waterwheel or an assembly of wind rotor blades having parameters (such as propeller pitch or using a hatch) that may be controlled. For steady flowing streams and rivers, without much flow rate variation, a constant speed output can be easily produced by compensating the input. In strong tide and river current turbine applications, considerably more control is required due to the more extreme variation, for example, in water velocity from practically a calm river to a high velocity storm driven stream so as to not break the meshed gear gearbox at the input. This may be rectified by using a magnetic gear comprising magnetic poles which will not breakdown. As shown in FIGS. 2A, 2B and practical application FIG. 6 of the priority '655 patent application, a magnetic gear of a magnetic gearbox 620 (replacing mechanical gears with teeth) may provide an input to a Hummingbird speed control converter to provide a high efficiency, high power, low maintenance electric power generating system which is also scalable to different capacity needs. Use of a constant speed motor may be used with the Hummingbird models to achieve the improvements to constant speed/frequency and voltage control.

In MHK turbines, for example, the VT&PG may be used to advantage regulating output shaft rotational velocity to a constant value. The concept of releasing power is now explained. There is a specially designed harnessing module for capturing as much river or tidal water flow as possible (torque τ and rotational speed ω) which may vary with water flow rates and at particularly chosen locations on a river or tidal estuary. There is a control module, the Hummingbird, used to convert variable captured water energy to a constant value of energy for driving a load generator of power that is then provided to a grid or stored in batteries. The generator load helps the control input (front a control motor—AC or DC) to unwind or release the input energy. By "release" is intended the definition of rotationally turning a control in one direction or another direction. In one embodiment described herein, a set of worm and pinion gears is a one-way control of a control motor for the Hummingbird control module. Unwinding input rotation of a harnessing module by a control motor with a set of worm and pinion gears requires less torque than input torque. The input torque (the harnessing module) does not change when unwound and the renewable energy harnessed may be ten times the power value used by a control motor. The layout of harnessing module, control module and generator load may be completed, for example, as a twenty-five kilowatt river or tidal turbine. Required controls are a variable load control to assure a constant electrical energy output and grid connector control for connection to a microgrid.

FIG. 1(A) through FIG. 17 of the present application are provided by way of example to show river and tidal turbines operating under principles of one of balancing torque, matching a minimum control power to a maximum output power, and then controlling the multiple of output power over constant power by means of, for example, a worm and pinion at 10/1, the application of magnetic gears of a magnetic gearbox, a conventional twenty-five kilowatt electricity generator or a known VT&PG (VOG) in an MHK turbine, output speed or electric current frequency control from variable to be relatively constant via a constant speed control motor and the various prototypes of Hummingbird three variable gear assembly embodiments (mechanical frequency converter) used to convert variable water (and wind flow rates) to balance torque and match variable harnessing module revolutions per minute and harnessed torque τ to constant frequency, current and voltage rates for provision to a twenty-five kilowatt load of an electric grid at varying water flow rates (tidal flow included). A constant speed motor of a Hummingbird speed control apparatus may be powered by the grid or by the input generated power or use in a distributed environment, for example, the commutatorless, brush-less DC generator as described above to output harnessed renewable energy to run the control alternating or direct current motor. The same principles may be applied to solar, wind and MHK turbines to obtain constant output rotational velocity or electric current frequency and voltage and to adjust propeller pitch in comparison to variable wind/water or solar renewable energy sources.

These and other embodiments will be described with respect to the drawings, a brief description of which follows.

BRIEF DESCRIPTION OF THE DRAWINGS

FIG. 1(A) through FIG. 1(B)(3) comprise prior an mechanical assembly diagrams for a basic spur/helical gear assembly, also known as a Transgear gear assembly, first appearing as FIG. 4B of U.S. Pat. No. 8,388,481; FIG. 1 of U.S. Pat. No. 8,485,933.

Figure 1A:
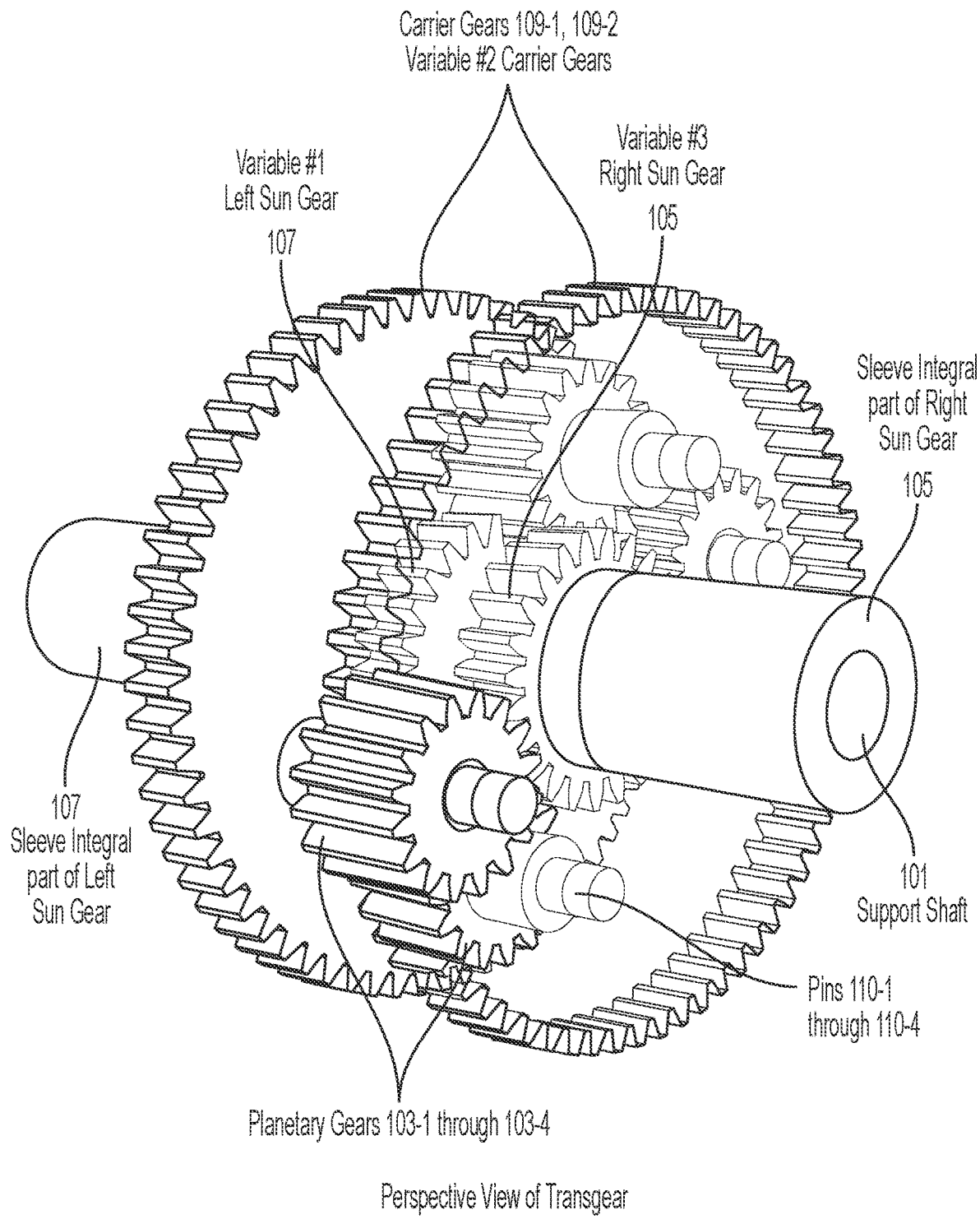

Carrier discs (gears) 109-1, 109-2 have carrier pins 110-1 through 110-4 connecting carrier disc 109-1 to carrier disc 109-2 (FIG. 1(A), FIG. 1(B)(1), FIG. 1(B)(2) and FIG. 1(B)(3) which carrier discs 109-1 and 109-2 may operate as a variable control and may rotate together in either direction to control speed of variable input #1 from a left sun gear 107 to constant rotational output speed at variable #3, right sun gear 105. The left sun gear 107 may be turned by support shaft 101, the right sun gear 105 and the carrier gears or discs 4-09109-1, 109-2 may provide six assignments of variables, input, output and control and pins 110-1 through 110-4 carry meshed planetary gears 103-1 to 103-4. Two Transgear assemblies are combined to form a Hummingbird three variable control first shown in FIG. 3.

FIG. 1B (prior art) comprising FIGS. 1(B)(1) through 1(B)(3) show further details of a Transgear spur/helical gear assembly wherein, FIG. (B)(1) shows only one carrier disc 109-1 for simplicity. A second carrier disc 109-2 is shown in FIG. 1(B)(2) and in cross-sectional view FIG. 1B(3). Arrow A of FIG. 1(B)(2) sections carrier disc 109-1 and arrow B sections carrier disc 109-2. FIG. 1(B)(2) shows the assembly of carrier discs 109-1, 109-2 which may be control discs which can turn together in either direction around support shaft 101.

Figures 2A, 2B:
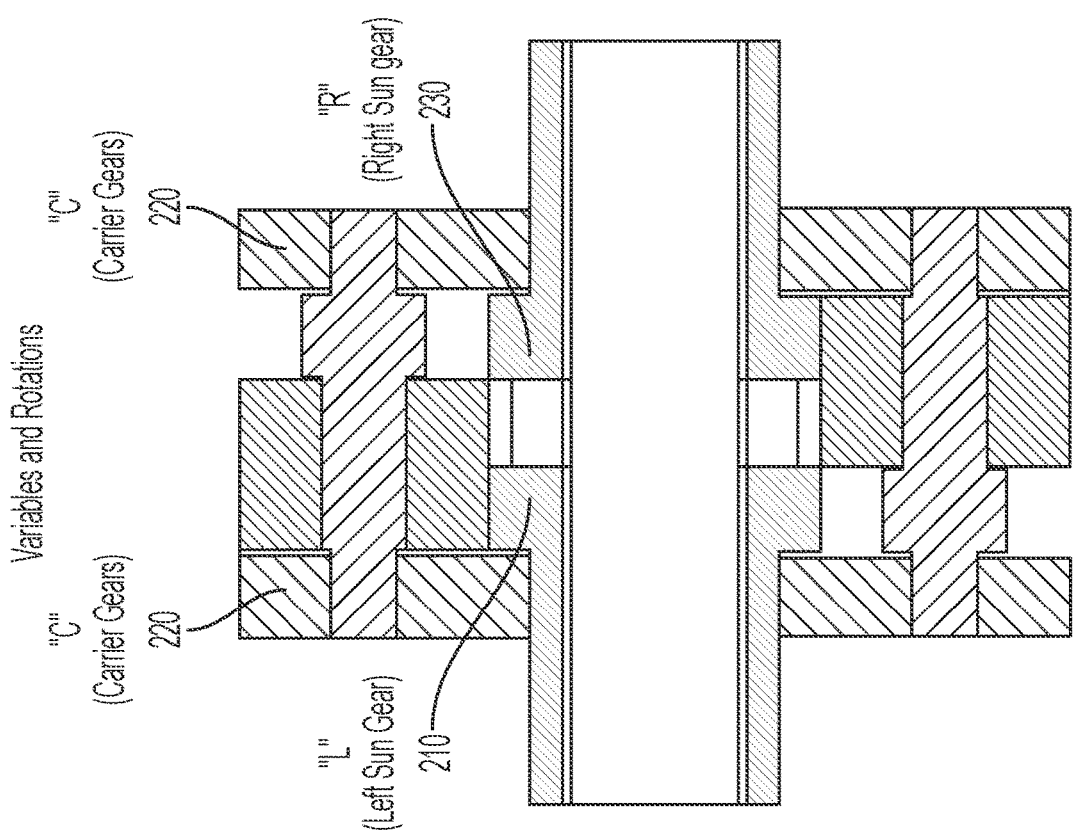

FIG. 2A and FIG. 2B show in FIG. 2A a basic spur gear Transgear assembly and in FIG. 2B the ratios of left sun gear 210 L with a rotational speed ratio of 1 are given as L=2C−R and held at 1, carrier gears (C) 220 ratio per the equation C=(L+R)/2 and right sun gear (R) 230 rotations or number of revolutions ratio is given by the equation R=2C−L. When a ratio value is 0, it is intended that the identified gear, carrier or right sun gear is not rotating, braked or grounded.

FIGS. 2A and 2B shows a basic spur/helical gear assembly in FIG. 2A and, by adjusting gear ratios, the relative speeds of a left sun gear, a carrier gear and a right sun gear of the assembly may vary. Formulae or equations are for calculating rotational gear speed or number of revolutions ω where the carrier gears (C) may, for example, vary from 1, ½, ¼, ⅛ and 0 and the resultant rotational speed of the right sun gear (R) from +1 to −1 through 0, −½ and −¾ if the left sun gear (L) maintains at 1.

Figure 3:
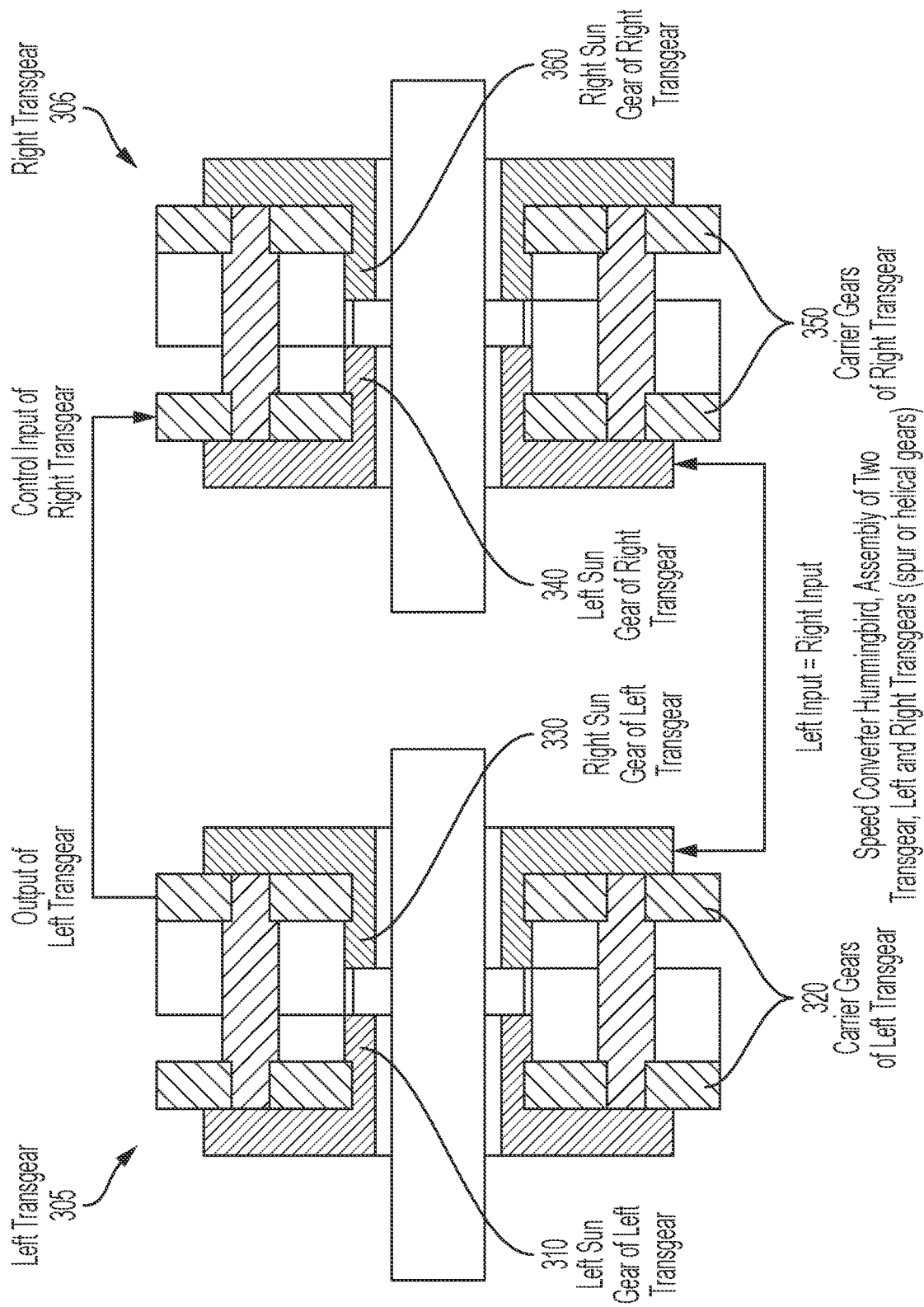
FIG. 3 of U.S. Pat. No. 8,641,570, where in the '570 patent.

FIG. 3 shows how a Hummingbird control or speed converter is assembled from a first left Transgear assembly and a right Transgear assembly, each of which comprises a spur/helical gear assembly. A Transgear may apply its variables in six ways. A left sun gear 310 of a left Transgear assembly may, for example, be a control #1. A carrier gear 320 of the left Transgear may, for example, be a left output #1 of the left Transgear which becomes the right control #2 shown as a top arrow which connects to carrier gears (discs) 350 of the right Transgear. At the bottom, a right sun gear 330 of the left Transgear may be left input #1 and connect to right input #1, left sun gear of right Transgear 340 as indicated by bottom arrow. The output of the Hummingbird control of FIG. 3 may be the right sun gear 360 of the right Transgear and be output #2.

Figure 4:
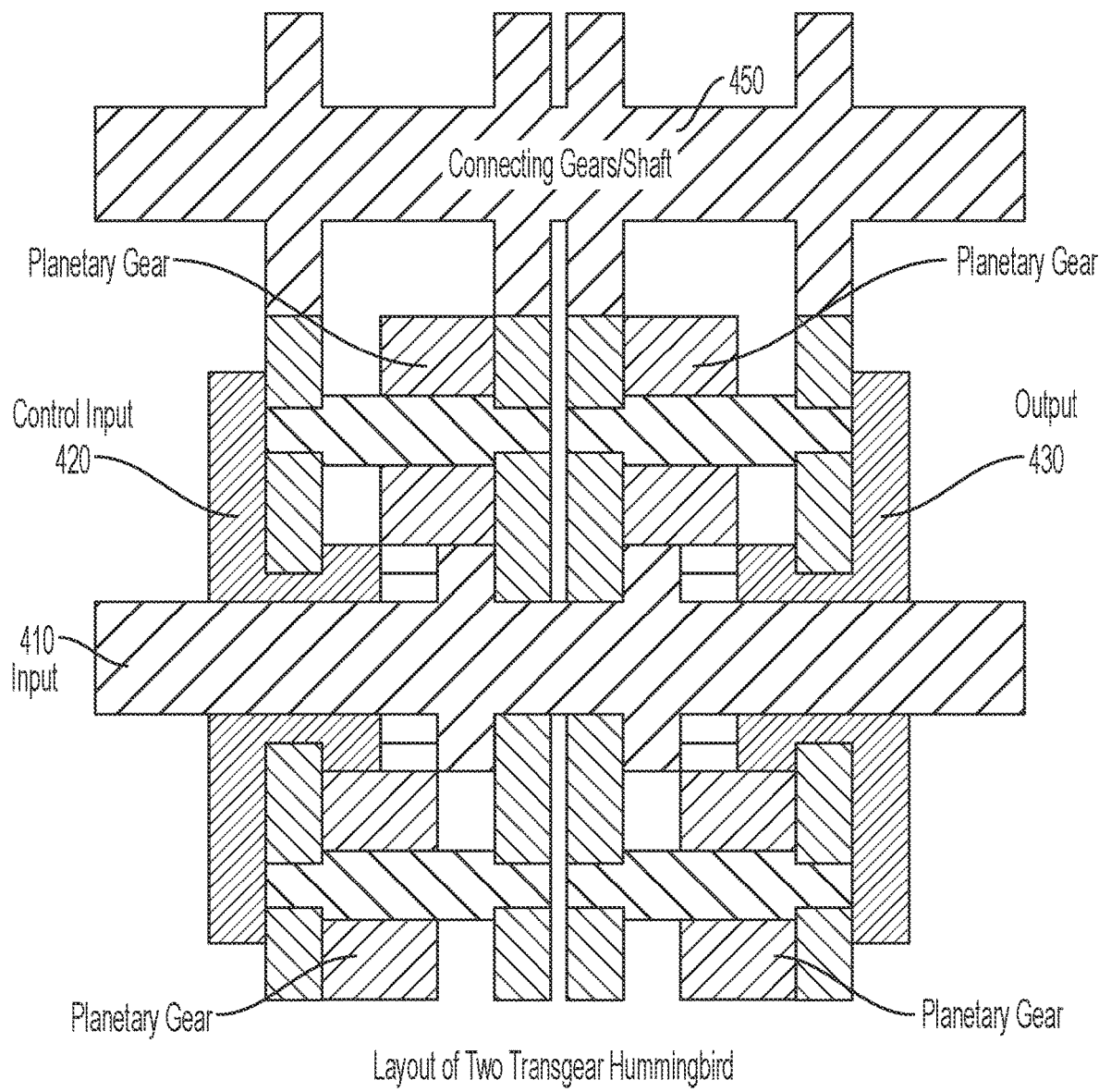

FIG. 4 shows a complete layout of a Hummingbird control which adds a connecting shaft which connects the left Transgear assembly of FIG. 3 to the right Transgear. Input shaft 410 comprises a right sun gear of the left Transgear and also the left sun gear of the right Transgear, So the Hummingbird in use has an input variable (input shaft 410), a control variable (Control) and an output variable (Output) right sleeve and sun gear. The right sun gear of the left Transgear drives a planetary gear (top) of the left carrier assembly. The Control left sun gear and sleeve of the left Transgear meshes with a planetary gear (bottom) of the carrier assembly. The carrier of the left Transgear assembly meshes with the connecting gears (four shown) of the connecting shaft which connects the left and right Transgear carrier discs. The left sun gear of the right Transgear connected to or integral with the input shaft 410 meshes with a planetary gear (bottom) of the carrier of the right Transgear. The planetary gear (top) of the carrier of the right Transgear meshes with the right sun gear/sleeve of the right Transgear which is the Output variable. In summary, the Hummingbird control comprising first and second Transgears may have three variables, an input, an output and a control.

Figure 5:
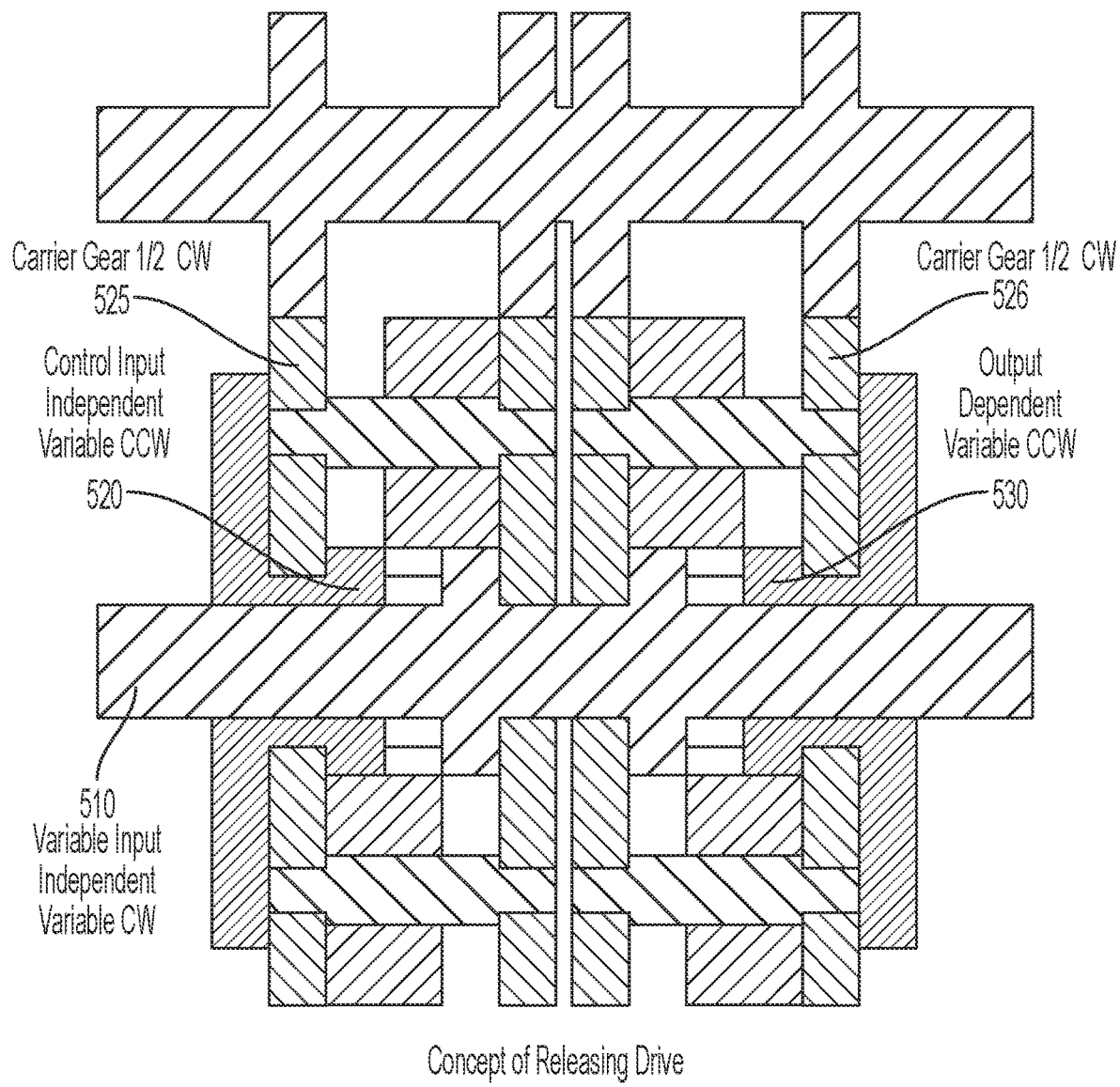

FIG. 5 shows the Hummingbird speed converter of FIG. 4 with the concept of releasing drive. CW represents clockwise rotation and CCW represents counterclockwise rotation. Variable input driving energy or power from river or tidal currents (a renewable energy harnessing module, not shown) is received by drive shaft 410 rotating CW. The output has a resistive load which typically comprises a generator of electricity and has a load which causes the shaft not to rotate and have a rotational speed of 0 rpm. An object of releasing drive is to generate electric energy at constant power from a variable input. A control dependent variable 520 comprising the left sun gear/sleeve of the left Transgear rotating CCW turns the carrier planetary gear (bottom) and the input right sun gear of the left Transgear turns the planetary gear (top) as ½ clockwise rotation. Via the connecting gear and the left sun gear of the right Transgear, ½ CW is applied to the right Transgear. When the resistive load is sufficiently high to create no output rotational speed, for example, the left sun gear/sleeve 520 of the left Transgear will be driven and turn CCW. The driven control dependent variable 520 can be used as a control Input 510 to reduce/release the required power so the generator may provide an output.

Figure 6B:
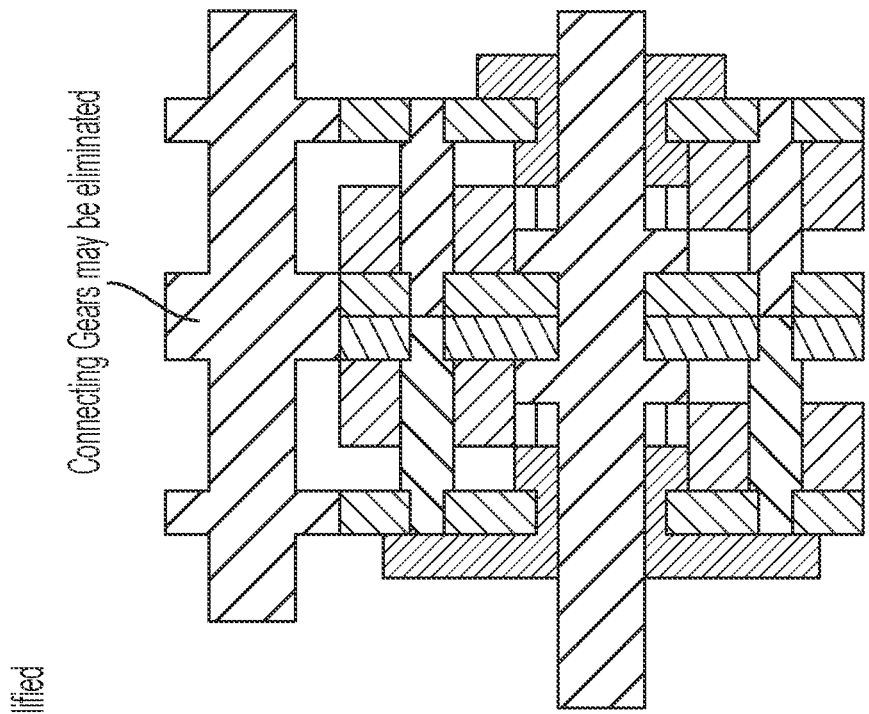
Figure 6A:
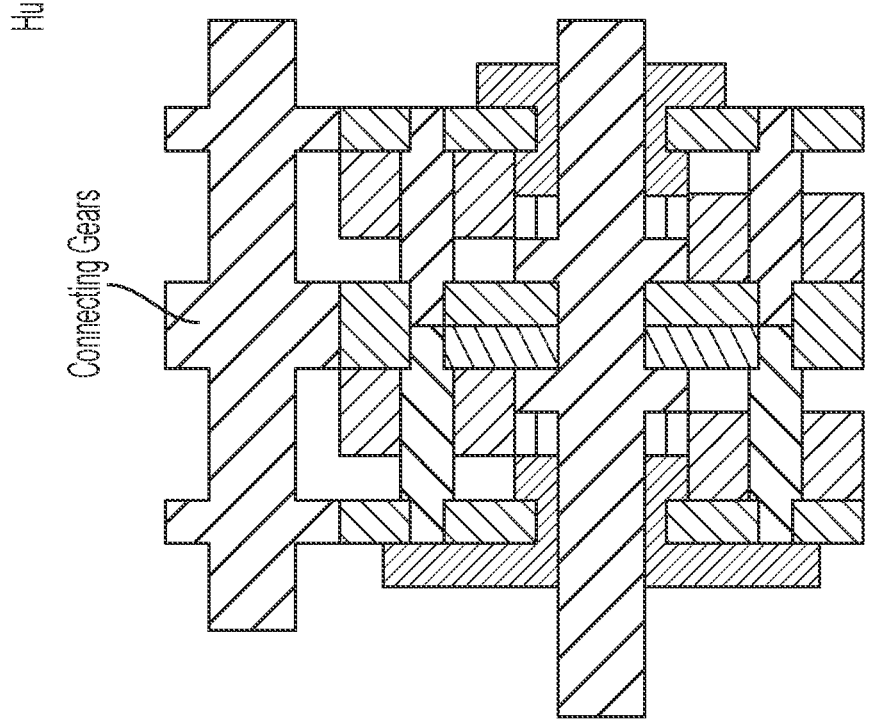
Figure 6D:
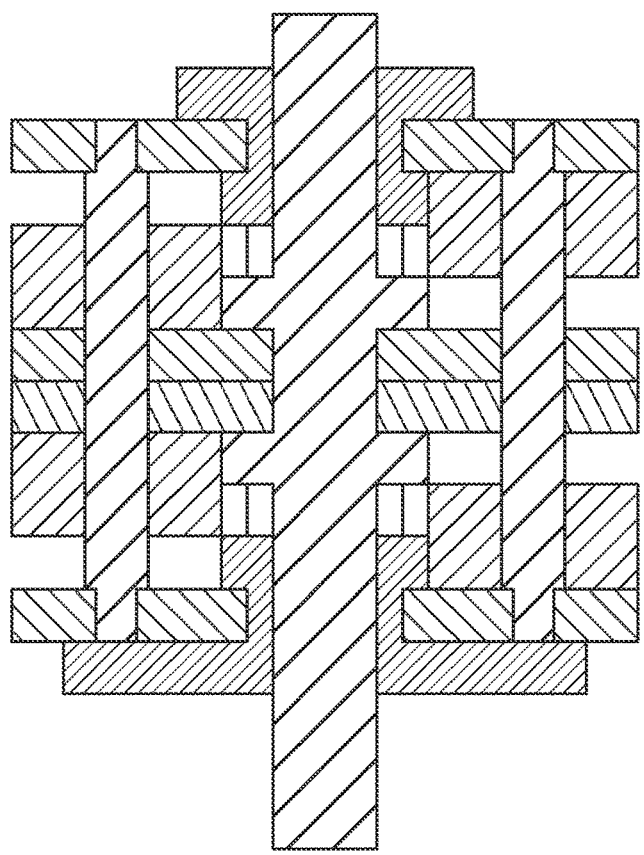
Figure 6C:
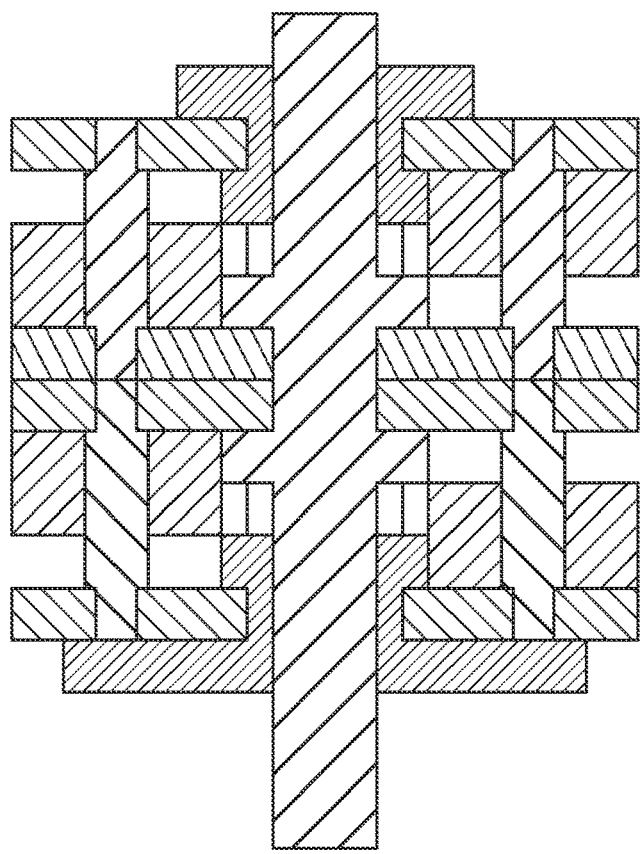
Figure 6E:
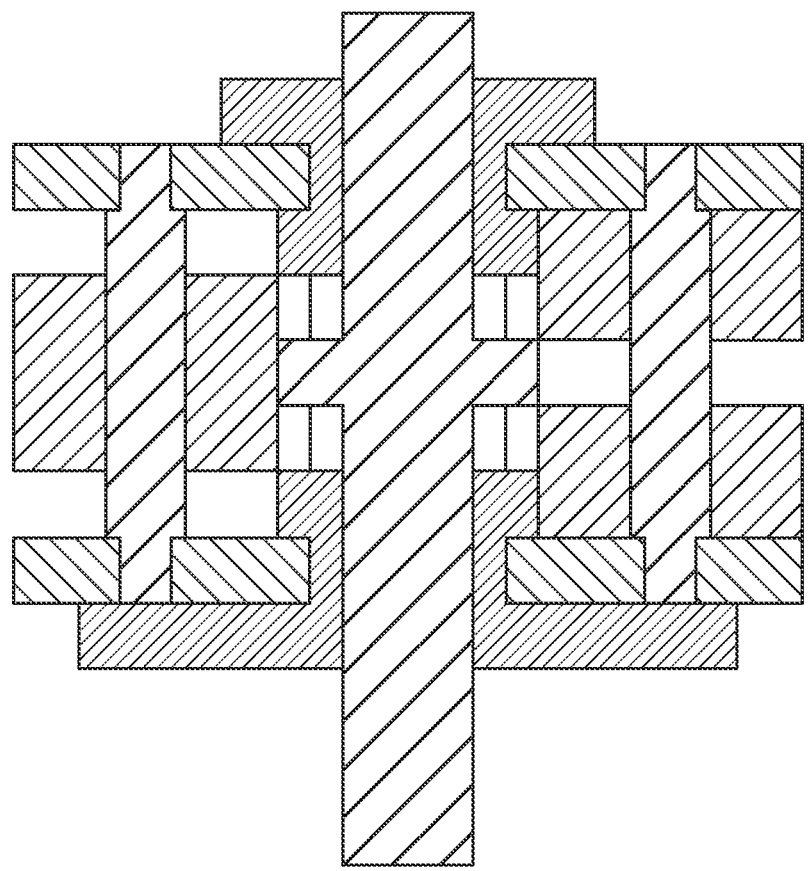
Figure 6F:
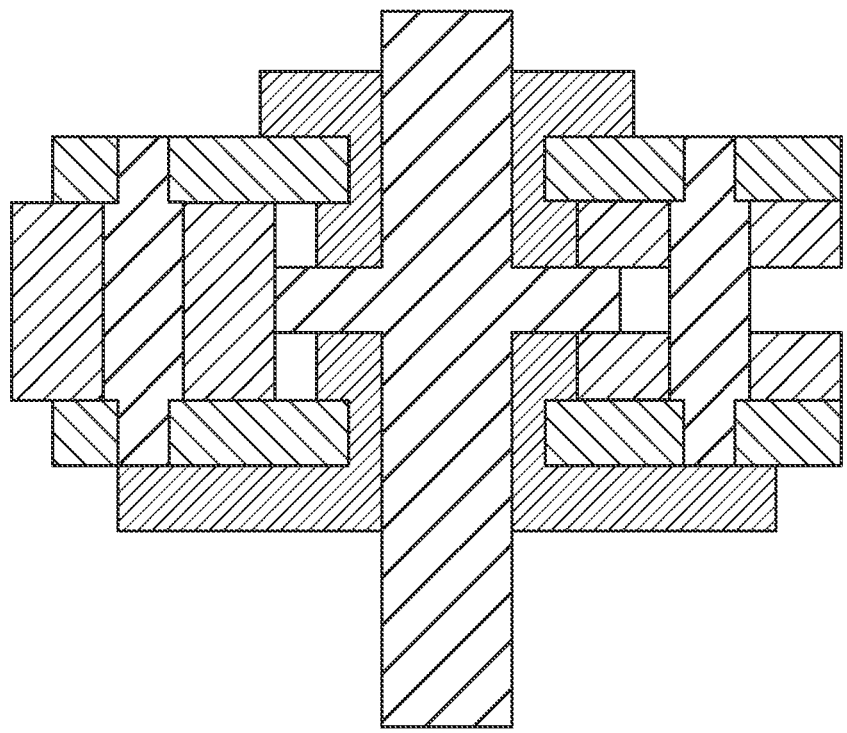

FIGS. 6(A) through 6(F) show how a complex Hummingbird speed converter, for example, similar to the dual Transgear assembly of FIG. 5 may be simplified into various embodiments. For example, FIG. 6(B) shows a reversal of the placement of the planetary gears of the right Transgear so the planetary gears (top) are proximate one another and the connecting gear may be eliminated. FIG. 6(C) shows elimination of the connecting gear seen in FIGS. 6(A) and 6(B). FIG. 6(D) shows a joining of the carrier pins of the left and right Transgears so as to be one carrier pin across left and right Transgears for the upper and lower planetary gears. FIG. 6(E) shows elimination of the right carrier disc of the left Transgear and the left carrier disc of the right Transgear so that the planetary gears (top) are joined to form a single planetary gear and the left and right sun gears of the input shaft are combined as a single sun gear at the center of the Hummingbird control assembly embodiment. The two bottom planetary gears remain separate from one another but the central carrier discs have been eliminated. FIG. 6(F) shows a simplified Hummingbird of FIG. 6(E) where any spaces between planetary gears is removed to form a more compact assembly than FIG. 6(E). FIG. 6(F) shows a preferred simplified Hummingbird control embodiment.

Figure 7:
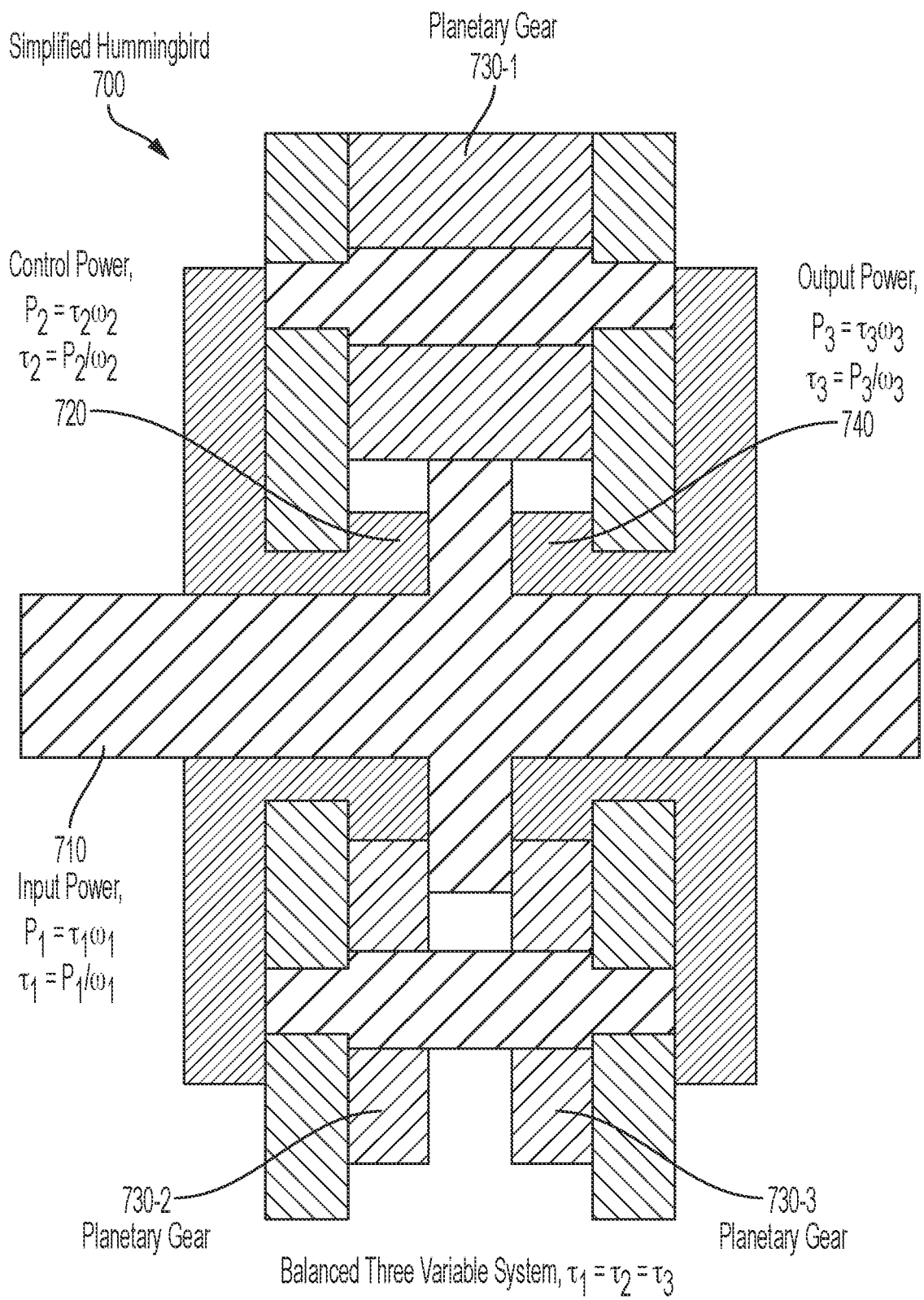

FIG. 7 shows the concept of balancing a three variable system using the simplified Hummingbird control of FIG. 6(F) as the operable, exemplary embodiment. Torque τ is defined as the concept of harnessing a force, for example, from river current flow pushing a paddle wheel or turning a propeller that operates on a moment arm to generate, for example, foot pounds of torque. Torque in regard to a rotating input shaft 710 driven by a harnessing module will rotate at a rotational velocity $\omega_1$ which when multiplied by torque $\tau_1$ results in energy or harnessed input power. An object is to harness or collect river or tidal current flow power and convert it to electrical energy as Output Power. All three torques (input, output and control) may be equal to balance the Hummingbird control system. On the other hand, input torque $\tau_1$ must be greater than or equal to $\tau_2$ or $\tau_3$. Input power harnessed by a harnessing module (not shown) is given by the equation $\tau_1 \omega_1$. This input power should be greater than or equal to generated output power to continuously, for example, provide twenty-five kilowatts of output power to a load. Isolating the input torque $\tau_1$ we arrive at the equation Input Power (harnessed from a river) divided by the shaft rotational speed in revolutions per minute $\omega_1$. The torque values $\tau_1$, $\tau_2$ and $\tau_3$ can be kept unchanged or equal and balanced if both of the values of power, input and output power, can be increased or decreased at the same ratio. An objective is to increase the output power and decrease the control power so that as much input power is harnessed as output power as possible. It has been modeled that the control power for the Hummingbird control is about ⅛ or 1/10 of the generated or harnessed power. Torque and power are independent variables and rpm or rotational speed ω is dependent on river flow rate. Thus, as explained herein, the depth of a river and its speed or flow rate are important variables for choosing location of a river turbine. Input torque should be maximized as well as rotational speed of the input shaft 710.

Figure 8:
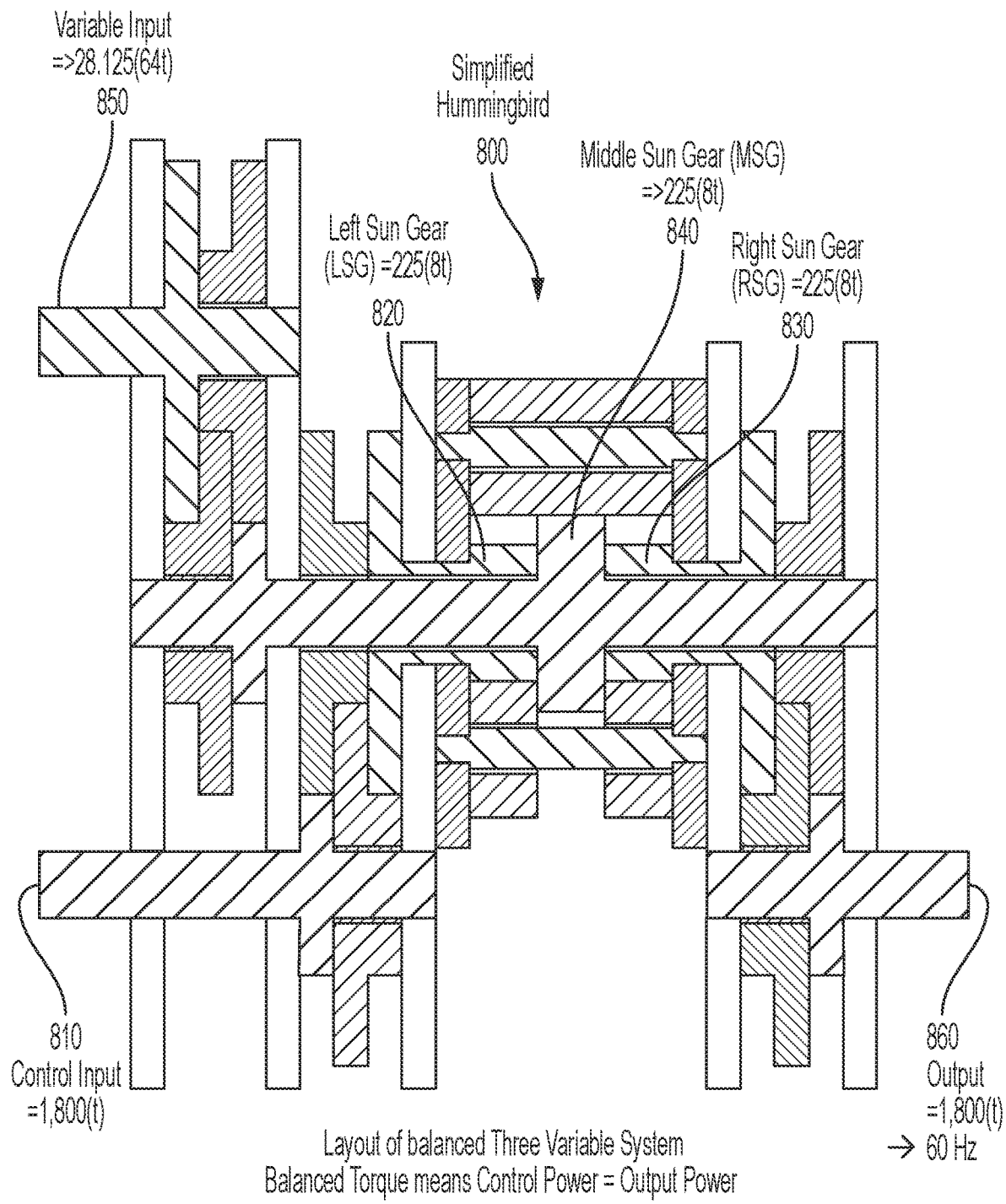

FIG. 8 shows a design layout for balancing a three variable simplified Hummingbird control system 800 further including, for example, a control motor rotational speed (received at Control Input 810) operating at, for example, 1800τ of power, and operating via a control motor input shaft and sun gear of Control Input shaft 810. A right sun gear/sleeve/extension disc 830 surrounding the shaft 840 is meshed at right via a gear box to Output 860 and, at the left of Hummmingbird 800, a left extension disc/sleeve/left sun gear (LSG) or left sun gear 820 receives 225(8τ) power of Control Input 810. The input Variable Input 850 from, for example, a harnessing module via a left gear box (perhaps a magnetic gear box) preferably has a power rating greater than or equal to 28.125 (64τ). A RSG or right sun gear 830 of the right sun gear/sleeve/extension disc to an output 860 opposite the left sun gear LSG 820 of a left extension disc/sleeve/sun gear surrounding a central shaft having a middle sun gear (MSG) 840 may operate at greater than or equal to 225 (8τ) power just as does the variable input 850 and is equal to the energy 225 (8τ) of the left extension disc/sleeve/sun gear LSG 820. The MSG or middle sun gear 840 of the simplified Hummingbird 800 has a power value of greater than or equal to 225 (8τ) and so is variable with harnessed river current flow. Variable Input 850 from the harnessing module may be greater than or equal to 28.125 (64 τ). The output is constant and Output 860 may be taken from a right gearbox to a generator load at 1800(τ) and represents an electrical frequency 60 Hz in the US (or 50 Hz) in Europe. Balancing torque means that the control input power 810 may equal the output power 860 or 1800(τ). In reality, the control power for a Hummingbird should be much less than the harnessed power value or the output power 860 to an electrical load or an electric grid.

Figure 9:
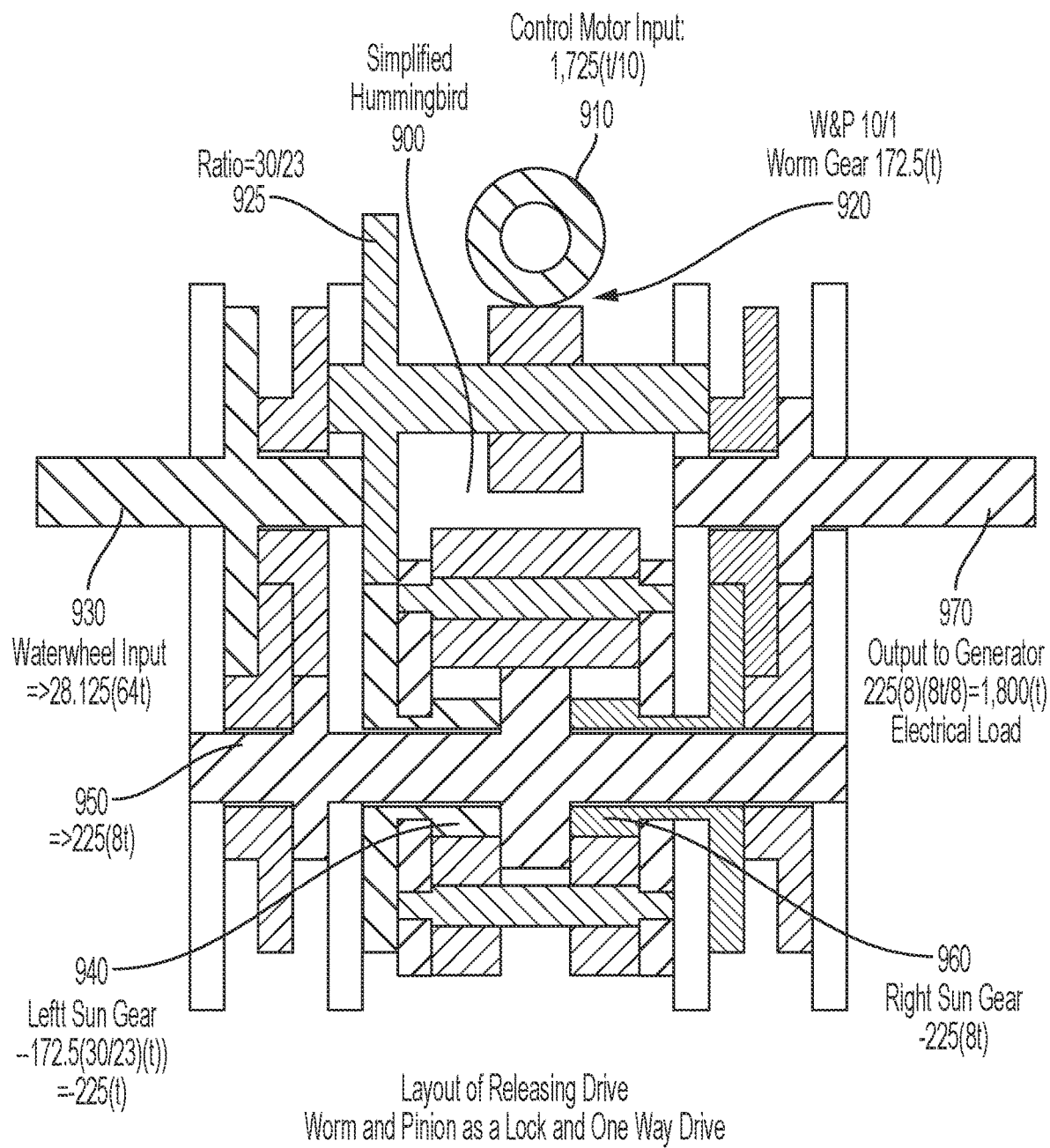

FIG. 9 shows simplified Hummingbird 900 and adds a control motor input 910 via a worm gear and geared shaft to simplified Hummingbird 900 having, for example, a control motor power input 910 of 1725(τ/10) via worm and pinion (W & P) 920 operating at 10/1 ratio and power 172.5(τ). FIG. 9 is a design layout of a releasing drive where the worm and pinion 920 from a control motor (not shown) may be a lock and a one-way drive and so be a releasing drive. The Gear Ratio 925 output by a sun gear of the W & P 920 may be 30/23 and is meshed with a left sun gear of a left sleeve of the simplified Hummingbird 900 shown as having a power 940 of −172.5 (30/23)(τ) which is −225(τ). The harnessing module (not shown) or Waterwheel Input 930 is fed to a gear box via an input shaft at a variable harnessed power greater than or equal to 28.125 (64τ). The shaft 950 of the simplified Hummingbird 900 is shown having a power greater than or equal to (225)(8τ). The right sleeve and sun gear of the simplified Hummingbird 960 is seen as having a power rating of −225(8τ). The output 970 to the generator (not shown) is constant (the load) and is related to the right gear box and calculated at 225 (8) (8τ/8) which is 1800τ which is the electrical load value of the generator (not shown). The Power Ratio is equal to P(Control) 910/P (Output) or (Produced) (or generated) 970=1725(τ/10)/1800 (τ)=1.0/10.434782. The Power Efficiency=P(Used)/P (Produced)=1.0/10.434782 or 9.58333%.

Figure 10:
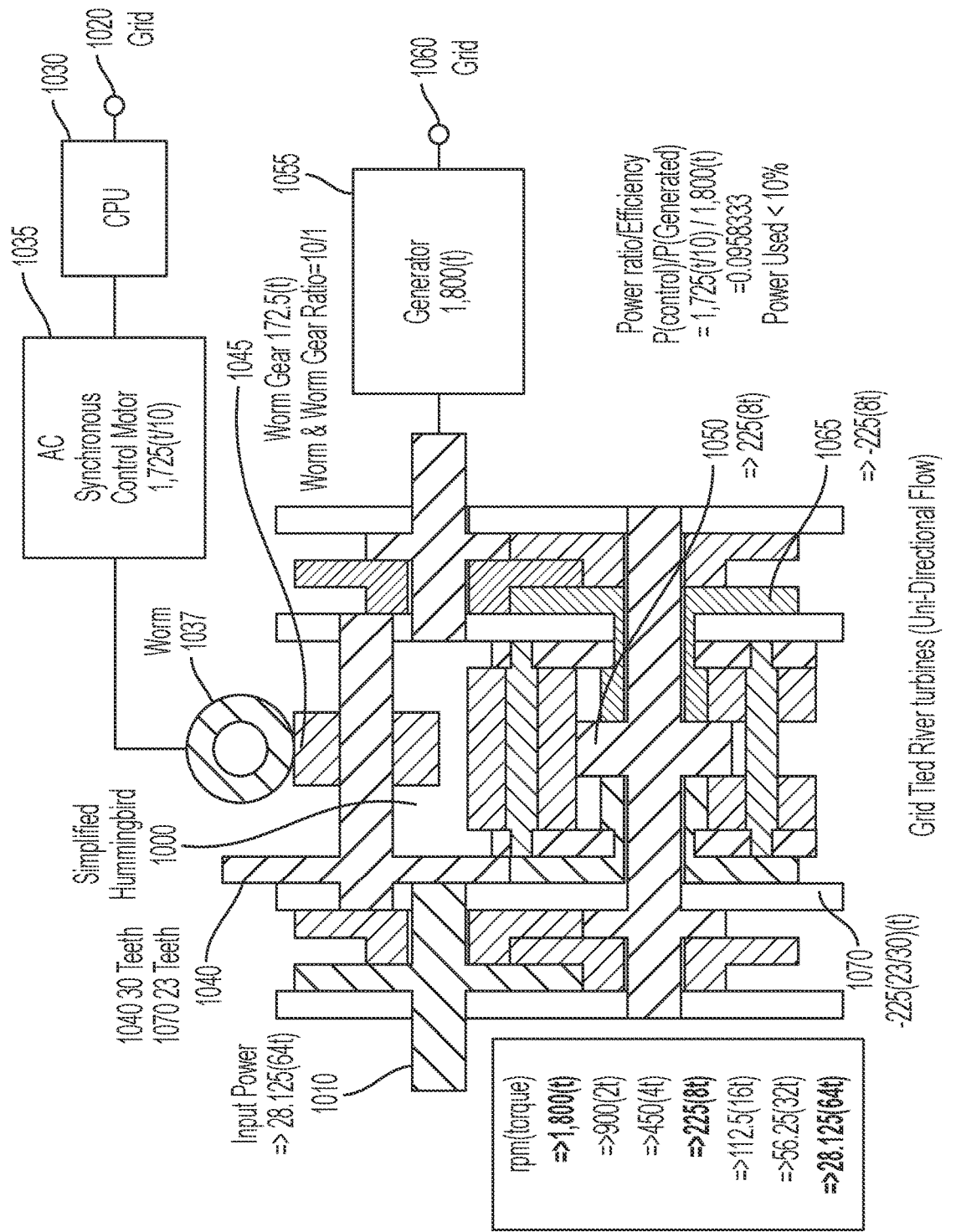

FIG. 10 shows a further embodiment of a simplified Hummingbird 1000 connected to an Input Power 1010 harnessing module (not shown) and outputting harnessed collected renewable energy to a generator 1055 to a grid 1060 which has an AC synchronous control motor 1035 which may use some power controlled by a central processing unit 1030 taken from the grid 1020 to operate the AC synchronous control motor 1035 for turning worm and pinion control 1045. (As mentioned above, distributed power means that the motor 1035 may be operated by harnessed power generated, for example, by a DC or AC generator such as a brush-less/commutator-less DC generator). The gear ratio 1040 of the W & P output gear to W&P gear may be 30/23 and translates at a left sleeve and sun gear of the Hummingbird 1000 at 1070 to −225 (23/30)(τ). So, FIG. 10 is similar to FIG. 9 in the power value figures shown but takes power from the grid 1020 to operate the worm and pinion gear control gear 1045. Harnessed input power from a harnessing module (not shown) is received as Input Power 1010 at an input shaft of a left gear box. The input power 1010 is greater than or equal to 28.125 (64τ) which is equivalent to any of the power values below: greater than or equal to 1800τ; 900 (2τ); 450 (4τ); 225 (8τ); 112.5 (16τ) and so on to 28.125 (64τ). In this grid-tied river turbine where there is assumed to be river current flow in one direction at the location of the river turbine, Input power 1010 is received at a gear box which may be a magnetic gear box so as to permit slippage in heavy water flow conditions. The left or input gear box feeds variable power to simplified Hummingbird control shaft at 1050 at greater than or equal to 225 (8τ). Control is provided as follows. Grid power 1020 may be controlled by central processing unit 1030 to power AC synchronous control motor at a constant 1725(τ/10). This is delivered to worm and pinion gear system at 10/1 for outputting 172.5(τ) at shaft 1045 having a gear ratio with an integral or connected sun gear at a gear ratio 1040 of 30/23. The sun gear is meshed with a Hummingbird left sleeve having a sun gear. To the right, the harnessed power greater than or equal to 225 (8τ) at 1050 turns the central sun gear of the simplified Hummingbird 1000 and a constant power output is delivered to a right gear box via a shaft to a generator 1055 having a constant load of 1800(τ) at, for example, 60 Hz at grid 1060. The Power Ratio/Efficiency is given as P(Used)/P(Generated)=1725(τ/10)/1800(τ) =0.095833 or the Power Used by the control motor or by the generator is less than 10%. As described above, a fraction of the harnessed water flow power may be used to drive a DC or AC generator for powering the control motor 1035 at constant speed.

Figure 11:
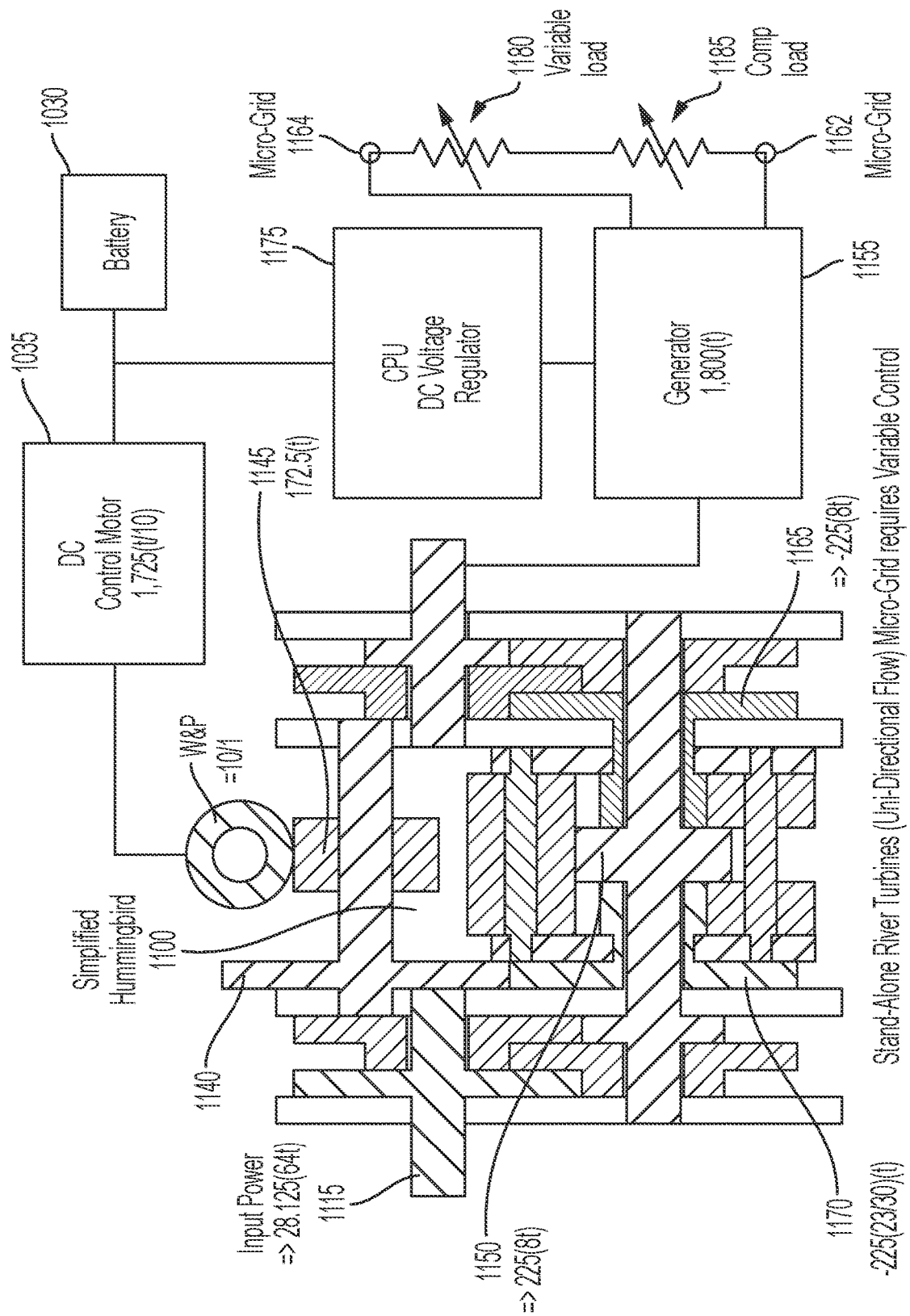

FIG. 11 provides an example of a stand-alone river turbine (river flow in one direction) which does not take power from the grid but rather delivers power to a micro-grid requiring variable load control. FIG. 11 shows micro-grids 1162, 1164 having a CPU controlled DC voltage regulator 1175 and a generator 1155 which may operate with a variable load 1180 and a compensatory load 1185 represented as a variac. A variac or rheostat may be controlled by a servo motor (not shown) for equalizing load, for example, at twenty-five kilowatts. A DC battery 1130 may store excess power and power a DC control motor 1135 at constant power 1725(τ/ 10) from power delivered via constant power generator 1155 rated at 1800(τ) and releasing power (or storing excess power) where releasing is used with the definition of turning in one direction or the other via a worm and pinion gear 1145 having a power at 172.5(τ) and a W and P ratio of 10/1.

First, the input from a harnessing module (not shown) providing a variable but sufficient power input is shown quantified at 1115 to be greater than or equal to 28.125 (64τ) input via a gear box to simplified Hummingbird 1100. This value is shown below as various multiples of rotational speed and torque. Worm and pinion 1145 may be at 10/1 and output −172.5τ at 1145. As above a gear ratio of a control gear may be 30/23 resulting in an input control of −225 (23/30)(τ) at 1170. Central shaft 1150 of simplified Hummingbird 1100 delivers greater than or equal to 225 (8τ) to an output gearbox (or 2000τ) which is controlled to a constant 1800(τ) at generator 1155. At right sleeve and sun gears 1165, the power value is −225 (8τ) as in FIG. 10. To the right, the harnessed power greater than or equal to 225 (8τ) at 1150 turns the central sun gear of the simplified Hummingbird 1100 and a constant power output is delivered to a right gear box via a shaft to a generator 1155 having a constant load of 1800τ at, for example, 60 Hz at generator 1155 to micro-grids 1162, 1164. The Power Ratio/Efficiency is given as P(Used)/P(Generated)=1725 (τ/10)/1800 (τ)=0.095833 or the Power Used by the DC control motor or by the generator is less than 10%.

The concept of releasing is exemplified as follows: 1) the generator is assumed to be a load; 2) the load helps the control input to release or store excess input; 3) a set of worm and pinion gears is a one way control; 4) Releasing or storing excess input rotation by a control motor with the set of worm and pinion gears required less torque than input; 5) the input torque does not change when released or stored: 6) the design of FIG. 9, 10 or 11 may be completed as a constant output product and 7) required controls are a variable load control (the generator) and grid connector control.

Figures 12A, 12B:
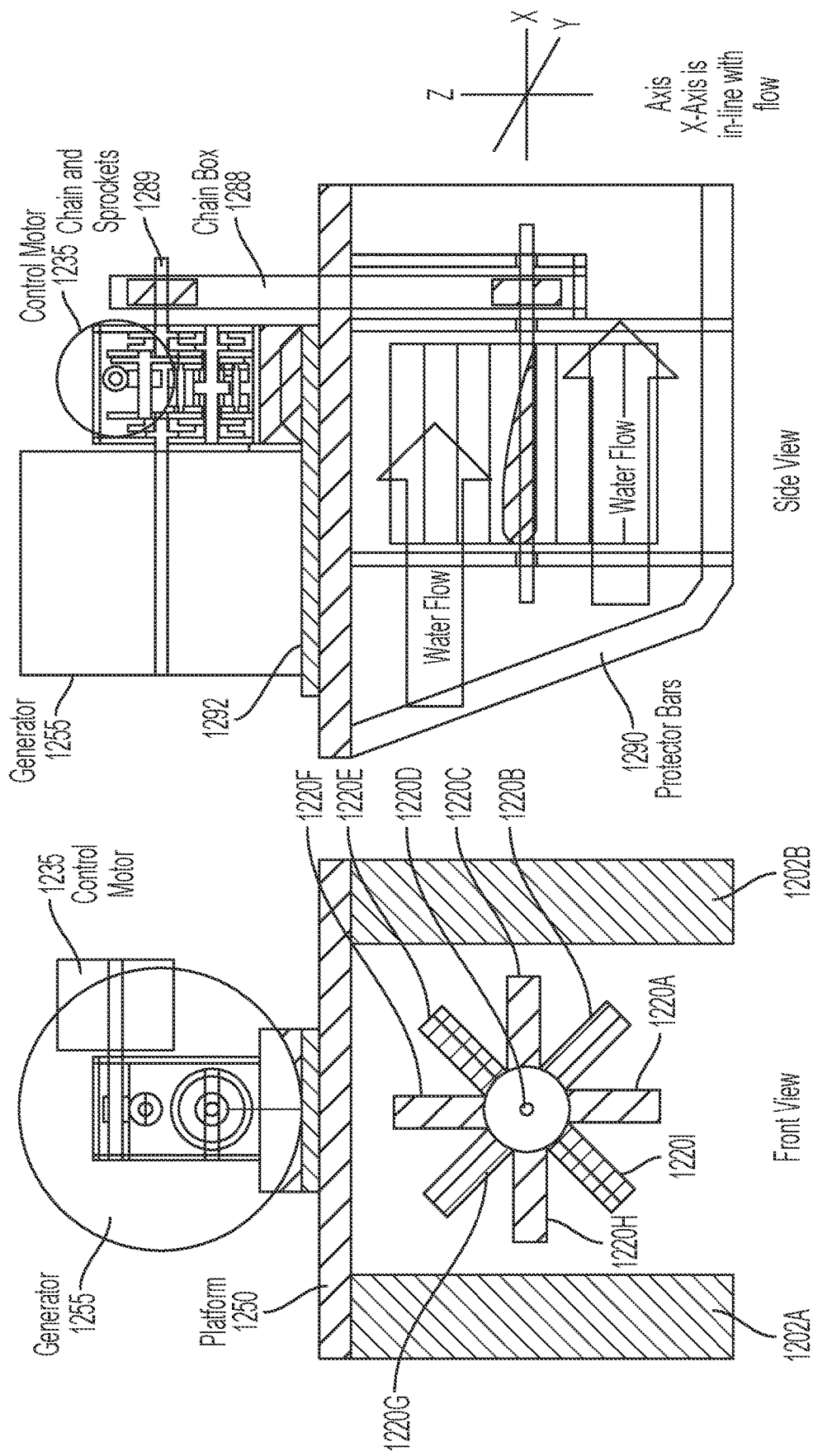

FIG. 12A (front view showing a renewable energy harnessing propeller below a flat floating platform 1250) and FIG. 12B (in line with water flow from left to right) show assembly of a floating river turbine where the X axis represents the axis of water flow, the Y axis is orthogonal and horizontal and the Z axis is vertical and orthogonal to the X and Y axis. FIG. 12A represents a front view and FIG. 12B represents a side view. FIG. 12A shows a floating platform for carrying a simplified Hummingbird, a control motor, a generator and chains and sprockets better seen in FIG. 12B so the harnessing module turns the control module which turns the electricity generating module. The floating platform 1205 floats (the harnessing module may be submerged in an alternative but complicates mechanical connection to the control and generating modules) because it may be floated on pontoons 1202A and 1202B and should be balanced so that it does not tip with riser flow and may be anchored to the river bottom or doubly anchored so that it does not sway with the current. One example of a harnessing module is shown that may comprise multiple, for example, from six to eight concentric wings 1220A through 1220I operating as a propeller harnessing module surrounding shaft 1220D. The larger and deeper the river and the faster the current flow, the more water energy that may be harnessed as renewable energy for generating electricity as per the power concept of torque times rotational speed in rpm. The harnessing module may have a tail (like a windmill) and be mounted so it may rotate with the river current and further operate on a variable axis and more closely match the water flow direction. Magnetic coupling of the harnessing module to the simplified Hummingbird is useful in times of turbulent currents to permit the magnetic coupling to slip. A variable overlap generator or VOG may be used, multiple generators may be used and the platform 1250 may be self-driven.

Referring to FIG. 12B, protector bars may protect the harnessing module from floating debris or debris that is below the surface of the water but carried by the river current. The protector bars 1290 are intended in protect the harnessing module. The water flows past the protector bars and meets the harnessing module which turns and generates torque and rotational speed (collected energy). It is preferable as discussed above, if the collected water energy exceeds the constant power output expected to be delivered by an output generator 1255 to a load. If the X axis is the water flow axis and is variable, it is intended that the chain and sprockets 1289 be adapted to move with the current and allow the harnessing module to sway slightly matching the current flow direction of the X axis. In a preferred embodiment, the river turbine assembly is designed to deliver a minimum of 25 kW of power which is sufficient to provide electric lights at night or run emergency equipment such as a water pump or provide basic necessities to a small riverside community (for example, of an undeveloped country).

Figure 12C:
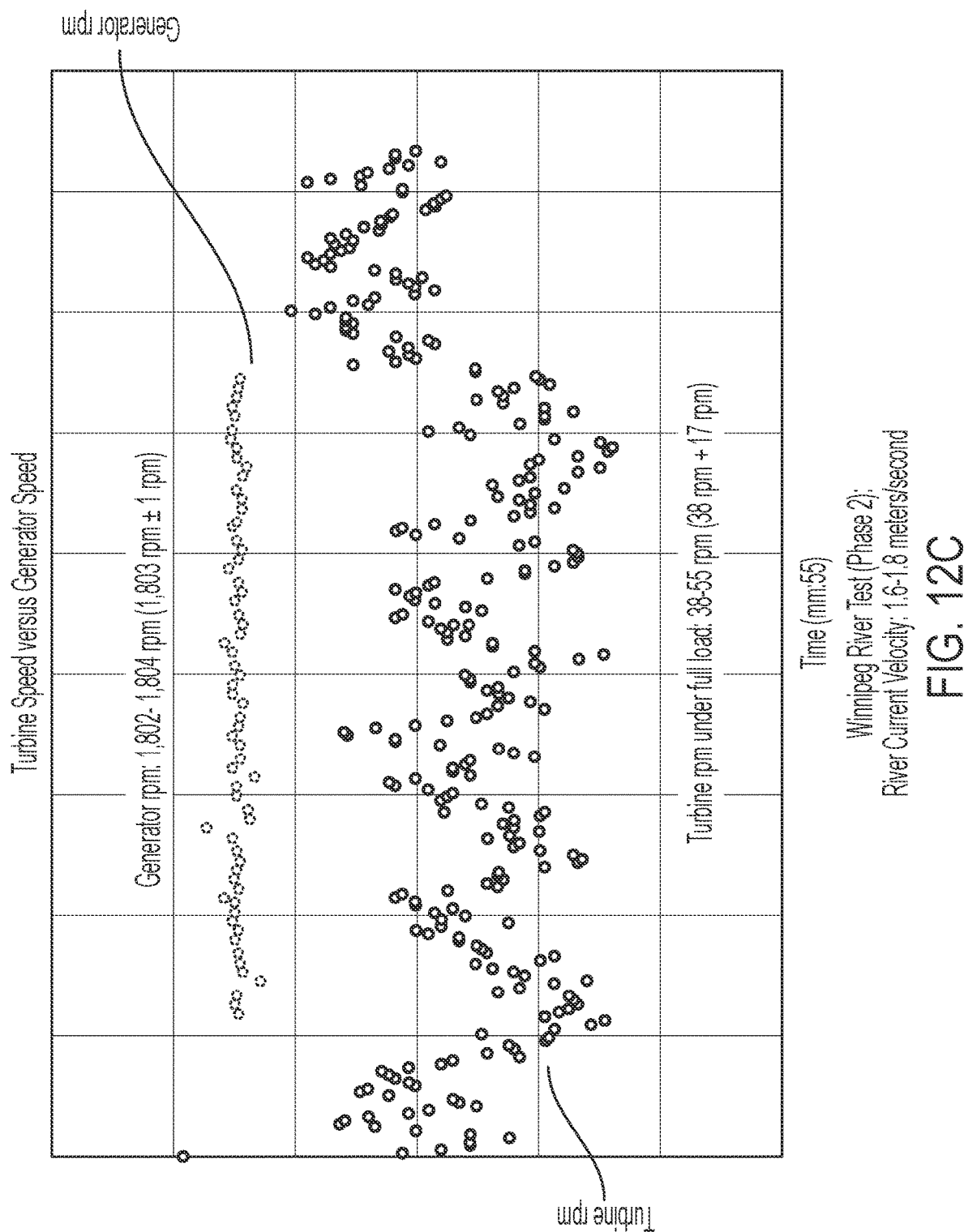

FIG. 12C shows actual experimental data collected on the Winnipeg river in Canada where the river speed's rotation of a waterwheel as measured at the harnessing module (waterwheel) by a speed tachometer varied from thirty-eight to fifty-five rpm showing over time a difference of seventeen rpm or a 44.7% variation or increase in rotational speed (bottom of chart: Variable River Speed). On the other hand, a test platform including a load and a Hummingbird control system provided a Turbine output between 1801.4 and 1803.6 rpm or an electrical frequency of 60.083 Hz plus or minus 0.036—vary stable electrical frequency output despite the variation in rpm input.

Figure 12D:
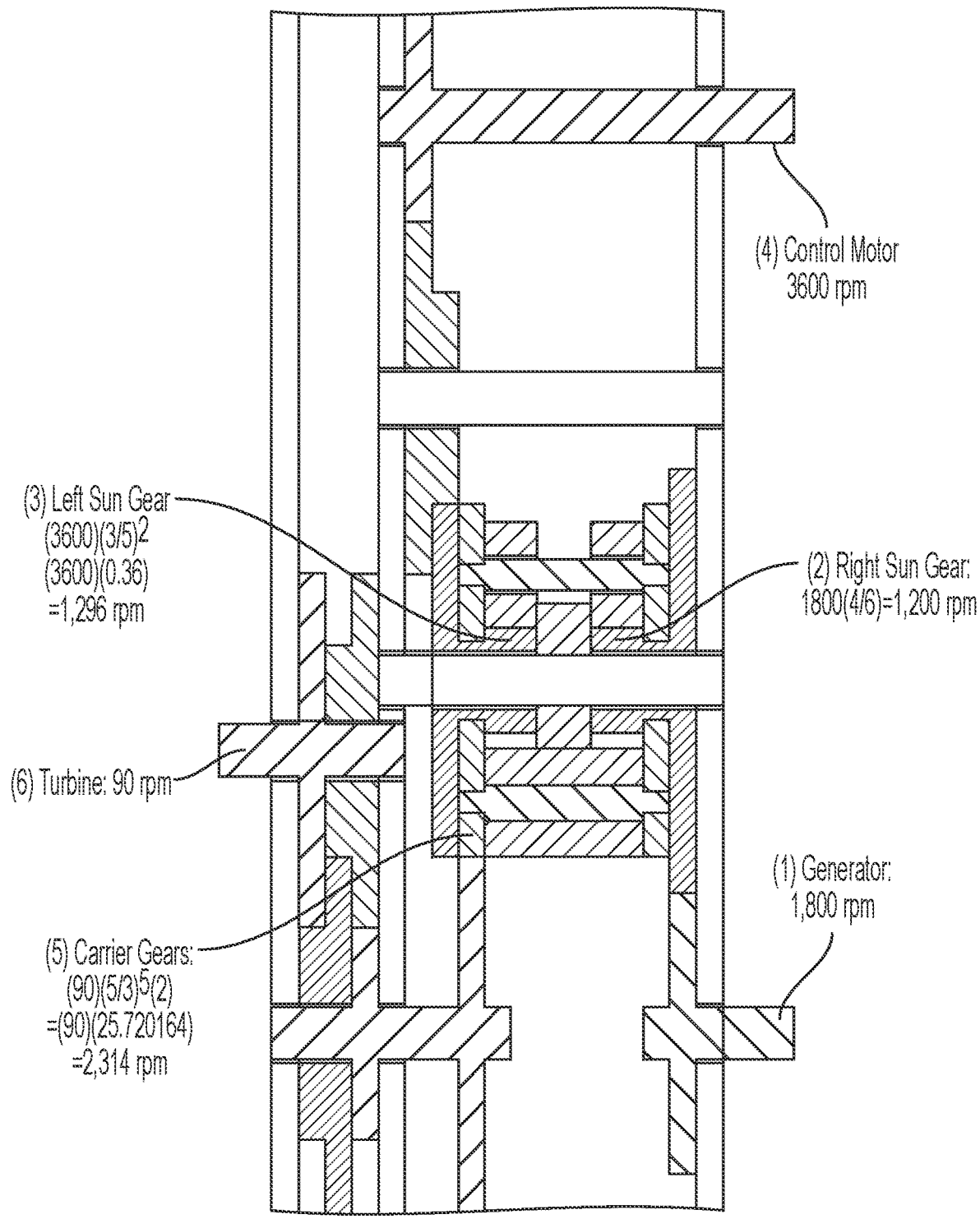

FIG. 12D shows a figure of a layout of an rpm balanced Hummingbird with dimension ratios shown, for example: control motor (4) at 3600 rpm was at 3.000 and dimension of gear at 3.000; left sun gear ratio (3) was at 3.000 to 5.000 or the rotational speed is calculated at 3600 $(3/5)^2$ or 1296 rpm; right sun gear (2) was at 6.0000 to 4.0000 or 1800 (4/6) or 1200 rpm; turbine (6) was at 90 rpm; carrier gears (5) of the Hummingbird were at 90 $(5/3)^5$ (2) or 2314 rpm and generator (1) output was at 1800 rpm or 60 Hz. A simplified Hummingbird is shown in the circle.

Applicant has had Pascal's principle of a balanced hydraulic system at the back of his mind. Pascal's principle, also called Pascal's law, in fluid (gas or liquid) mechanics, states that, in a fluid at rest in a closed container, a pressure change in one part is transmitted without loss to every portion of the fluid and to the walls of the closed container. Force is pressure multiplied by area and to balance pressure, pressure is force divided by area so that if a force is ten limes an original force, it is translated without loss as new force is ten times the original force depending on the original and other area to which the force is translated, for example, ten times the area to which the force is directed (with no loss).

A new principle evolved (which may be referred to as Han's principle) is that, in rotary motion mechanics and a closed mechanical system such as a Hummingbird, a three variable control system, a torque change in one variable is transmitted to other variables without major power loss in the system. This principle has been demonstrated on the Winnipeg river in Canada in a trial.

First, a harnessing module will be described to maximize harnessed renewable energy from the flow of water and then Han's principle will be described with respect to the control module and generating module representing a closed mechanical system where the closed Hummingbird control system has three variables.

FIGS. 13A and 13B show bi-directional river flow or tidal current capture by a harnessing module 1330 mounted to a floating platform 1310 where the waterwheel 1330 covered by a hatch 1320 which may move 180 degrees to either capture current flow from the right in FIG. 13A or from the left in FIG. 13B (motor for moving hatch not shown) where the hatch 1320 is moved 180 degrees (for example, when the water flow is the greatest between high and low tides and low and high tides according to a tidal table. In either case (water flow from the right or left), the harnessing module comprising six to eight water collectors (eight shown) mounted spatially separated around a shaft 1315 (of waterwheel 1330). The waterwheel 1330 will always rotate in a counter clockwise direction whenever there is water flow in either direction, and so any harnessed energy may drive a generator load (not shown) or be stored for periods of tidal change (for example, in a battery not shown coupled to a DC generator, not shown). The hatch position may match the changing tides which are dependent on a known schedule of high and low tide peak flows throughout a year and so the hatch position with respect to the waterwheel 1320 permits delivery of power by a generator Hummingbird (not shown) or a Hummingbird control motor (not shown) or other embodiment of a tidal turbine.

Figures 14A, 14B:
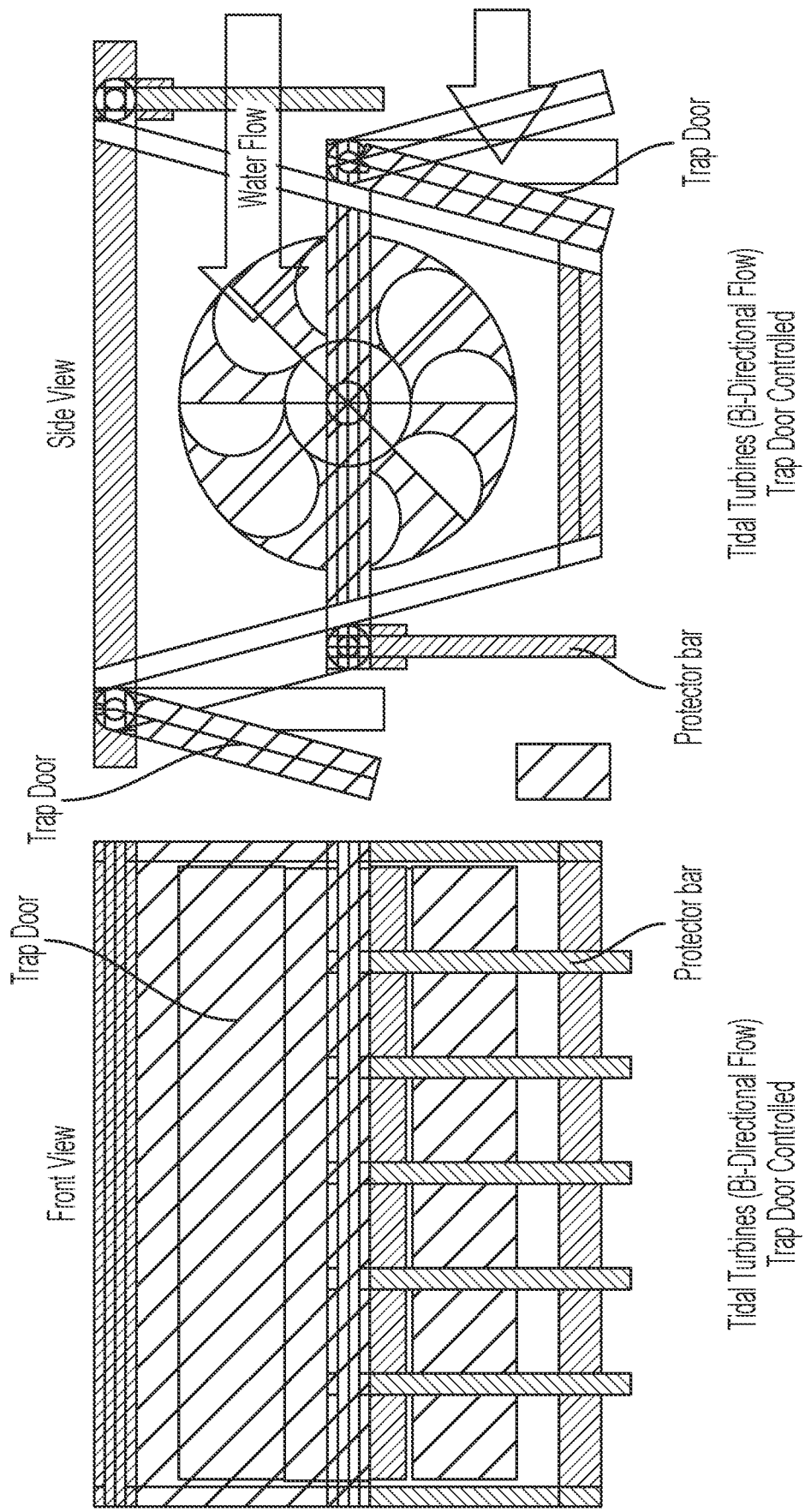

FIGS. 14A and 14B are intended to describe the design of a waterwheel or other harnessing module embodiment with respect to a load (such as a generator not shown) and a choice of a location on a river or tidal estuary. Referring to FIG. 14(B), there is shown in side view a typical waterwheel which if driven sufficiently by river or tidal water flow will turn the load (for example, the generator) and output electric energy. The waterwheel must be designed in consideration of torque $\tau$ and rotational speed $\omega$ I view of the particular water location chosen for the harnessing module. Torque is related to the active variables of radius of the waterwheel spoke members (eight paddles or buckets or other members) which reach from the shaft to the location along the X axis from the shaft where river current flow creates force at the moment arm of the members and so creates torque and rotational speed when the wheel turns. In the case of the depicted waterwheel, the torque is given by half the radius to the semi-circular buckets which catch water, and the force is the force exerted against the buckets or paddles or other members of a harnessing module by the current flow. The product of moment arm and water flow force yields torque. Consequently, the torque caused by the rate of river current flow may cause the waterwheel to turn and drive the generator at a rotational speed to which may vary. The higher the rotational speed and the torque, the higher the captured energy from the river flow. The river front view drawing of FIG. 14A shows a wide river portion which may be shallow and slow—it is best to pick a river location that is deep and has a fast water flow current to create rotational speed of the waterwheel. A river portion may be deep and have a high-speed current flow which is more ideal as a waterwheel location. Consequently, position on a river has an impact on harnessed energy so that the moment arms may be long and the various means to harness water energy are efficient, force is high and rotational speed of the waterwheel will vary as per FIG. 12C, for example. A given floating platform may comprise first and second waterwheels in series or in parallel to, for example, multiply the harnessed water flow energy by two. As suggested above, the waterwheel must be designed to develop at least a level of $\omega\tau$ to equal the load, for example, a twenty-five kilowatt generator. FIG. 14B shows a tidal flow in both directions where water flow from the left moves through the lower portion of the water wheel to a closable flap which is open when water flows from the left. The opposite happens when water flows from the right. Water flows past the stationary bar and flows through the moveable flap at the right via the top of the waterwheel. The waterwheel always turns counterclockwise in this example. At low tide, the tidal estuary may have no water and so no depth. It is important that a tidal estuary have depth at low tide as well as at high tide so that a waterwheel will not sink into the mud of the bottom of a tidal estuary. Ideally, positioning should be close to the ocean so that there is always water in the estuary at a sufficient depth, and also the tidal water flow can have some current flow in one direction or the other and sufficient depth at all hours of the day, even at low or high tide. As above, the X axis represents the direction of water flow, the Y axis represents the direction of the waterwheel shaft and the Z axis is vertical and is the direction toward a platform, labeled in FIG. 14B. In short, the harnessing module should be specifically designed for a specific location on a river or tidal estuary.

Figure 15:
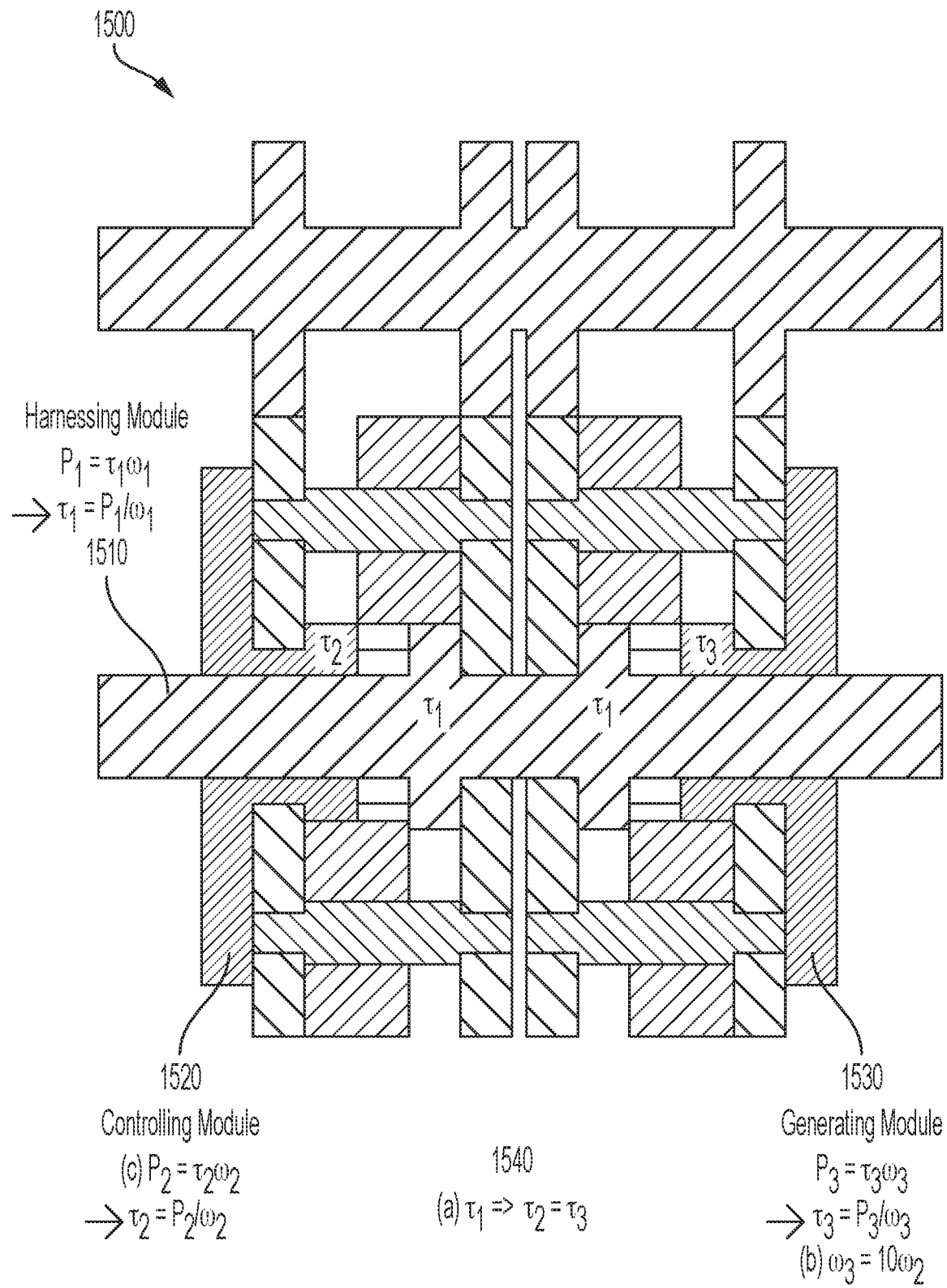

FIG. 15 shows Key Han's principle of balancing torque of a closed mechanical system and a principle of no or little harnessed energy loss through a twenty-four hour period of river current flow. A cross-sectional view of a complex Hummingbird control design 1500 is shown with a harnessing module 1510 (not shown) (but see FIGS. 13A, 13B and 14B showing waterwheels), the Harnessing Module 1510 being connected at left that generates $P_1 = \tau_1 \omega_1$ worth of power. In terms of torque and from experimental results at a given river location over time with a load, torque $\tau_1$ (shown as being applied to the central shaft of the Hummingbird 1500 must be greater than or equal to $P_1/\omega_1$ where $\omega_1$ is the rotational speed of the harnessing module (for example a waterwheel per FIGS. 13A, 13B and 14B) with a power load of the controlling module 1520 (of the Hummingbird 1500) and a power load of the generating module 1530. The controlling module 1520 is shown as left extension disc/sleeve/sun gear where a second control torque $\tau_2$ is shown where the power $P_2$ is the power of the control motor (not shown) and the rotational speed is constant $\omega_2$. Equation (c) for the controlling module 1520 is given as $P_2 = \tau_2 \omega_2$ which, solving for torque, yields $\tau_2 = P_2/\omega_2$. Equation (a) 1540 shows the torque relationship of a balanced system: $\tau_1 => \tau_2 = \tau_3$. The generating module 1530 is shown at right sun gear/sleeve where the generated power is $P_3 = \tau_3 \omega_3$, and equation (b) results such that $\omega_3 = 10\omega_2$. In this example, $P_3 =$ approximately 10 $P_2$ such that very little power (about 10%) of the controlling module power is lost by the controlling module 1520. FIG. 15 also shows equation (a) 1540 where the principle of balancing torque is shown in the following form: $\tau_1$ (Harnessing Module)$=>\tau_2$ (Controlling Module)$=\tau_3$ (Generating Module).

The process of designing a suitable harnessing module to achieve a minimum constant amount of power has been explained. In a river or tidal estuary trial, the design of the waterwheel which may be located below a floating pontoon may take days, months or a year or may require at least data collected on the river or tidal estuary over a period of a year or more, for example, to pick appropriate locations and measure minimum depth and river flow/waterwheel speed calculations over time (per FIG. 12C) to see how large the waterwheel may be to maximize torque and speed, how many waterwheels may be used in parallel (or in series) as necessary and how efficient the waterwheels may be at generating torque defined as force from the water flow at a radius from the shaft to generate torque measured at a torque sensor (not shown) for each module of the Hummingbird. A tachometer may be used in combination with a harnessing module, controlling module and generating module to measure rpm at full load. The control, generator and other equipment may be mounted on a pontoon with the harnessing module underneath which pontoon may be anchored to the river bottom or sides.

Figure 16:
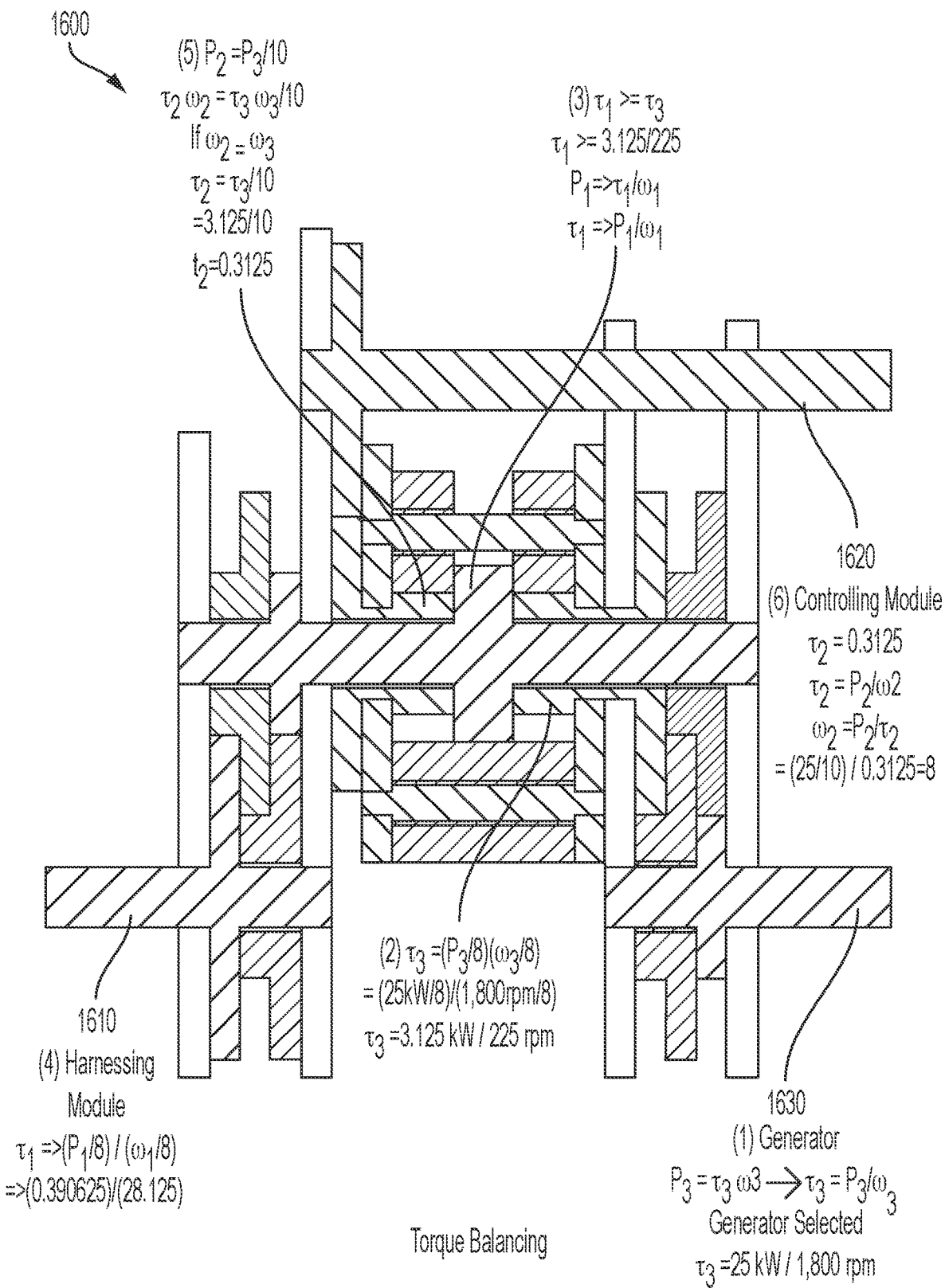

FIG. 16 shows a Torque balanced river turbine showing connections to a simplified Hummingbird control 1600. The harnessing module 1610 receives torque via a gearbox and, per design, $\tau_1$ is greater than or=to $P_1/\omega_1$ which is the waterwheel speed. The torque (turbine) is greater than or equal to (3.125/8)/28.125 where 28.125 is 225/8. At the controlling module 1620 (typically a constant speed motor, not shown), $\tau_2 = 3.125$ kW/225 rpm. At the generating module 1630, the same result is found in a balanced torque river turbine or $\tau_3 = (25/8)/(1800/8)$ or 3.125 kW/225. The Power ratio 1650 is given by P(Generator)/P(Control Motor)=25/

(25/8)=8/1. The power lost to the load which may include the control motor and the generator load is just 12.5% in this balanced mechanical system. In this case, per Han's principle 1640, $\tau_1$ is greater than or equal to $\tau_2=\tau_3$ in a balanced system.

Figure 17:
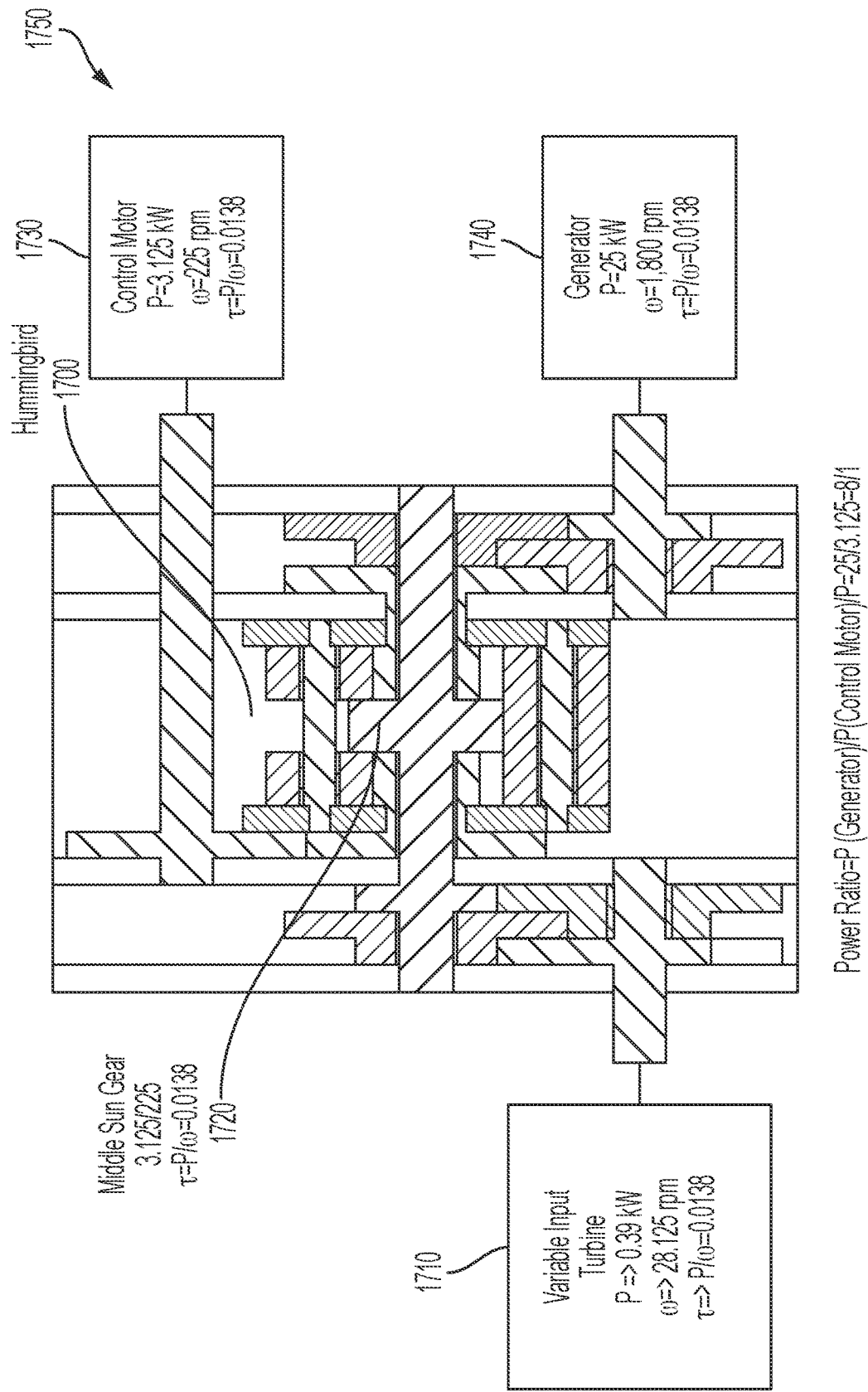
FIG. 17(A) is a left side view along line A-A.
FIG. 17(B) is a front view.
FIG. 17(C) is a right side view along line B-B.
FIG. 17(D) is a perspective view of a Transgear assembly from side B (with a carrier disc removed for clarity).

FIG. 17 comprises a further figure of a torque balanced river turbine having a simplified Hummingbird control 1700. Turbine 1710 has an energy or power P load of greater than or equal to 0.39 kW. The torque on the central sun gear 1720 of the Hummingbird is $\tau=P/\omega$ or 3.125/225 or 0.0138. The control motor 1739 has the same torque as the central sun gear or 0.0138 as does the generator 1740 at 0.0138. Again, the power ratio of the generator divided by the control motor is 25/3.125 or 8/1 meaning the control motor only represents ⅛ of the power of the generator and load or harnessed energy through the closed mechanical system according to Han's principle.

Having briefly described embodiments of the invention comprising a harnessing module, a control module (for example, a simplified Hummingbird control and a control motor having a constant output) and a generating module in the above Brief Description, a more detailed description follows.

DETAILED DESCRIPTION

In the figures of the present embodiments of the invention comprising FIGS. 1(A) through 17, an effort has been made to follow a convention such that the first reference number for a drawing component such as 1XX indicates a figure number as the first digit where the element first appears; for example, waterwheel or support shaft 101 first appears in FIG. 1(A). Similar reference digital numerals XX are intended to be used in the Figures to represent similar elements or components of drawings. For example, in FIGS. 1(B)(1), 1(B)(2) and 1(B)(3), component support shaft 101 is still shown in side view where 01 is XX, representing the same shaft seen also in FIG. 1(A). In like manner, FIG. 2A shows input left sun gear 210 (L), control carrier gears 220 (C) and right sun gear (R) output 230, with 2 being the first number of the figure but each of these gears may be rotate differently at different rotational speeds. For example, Carrier Gears (C) or Right gun gear (R) may be held, not rotate, be braked or grounded per FIG. 2B. FIGS. 2A and 3 follow the numbering scheme of FIGS. 2A and 2B as to XX (10, 20 or 30) but since in FIG. 3 a first Hummingbird control assembly of left and right Transgear gear assemblies are shown, the XX remains the same but the first digit 3 is changed because FIG. 3 does not show just a single Transgear assembly.

FIG. 1(A) through FIG. 1(B)(3) comprise prior art mechanical assembly diagrams for a basic spur/helical gear assembly, also known as a Transgear gear assembly, first appearing as FIG. 4B of U.S. Pat. No. 8,388,481; FIG. 1 of U.S. Pat. No. 8,485,933; and FIG. 3 of U.S. Pat. No. 8,641,570, where in the '570 patent, FIG. 17(A) is a left side view along line A-A; FIG. 17(B) is a front view; FIG. 17(C) is a right side view along line B-B; and FIG. 17(D) is a perspective view of a Transgear assembly from side B (with a carrier disc removed for clarity). FIG. 1A is a prior art perspective view of a Transgear gear assembly. FIG. 1A shows a support shaft 101 surrounded by a sleeve which is an integral part of right sun gear 105. A sleeve is also an integral part of a left sun gear 107. Planetary gear 103-1 is shown meshing with planetary gear 103-2 and with the sleeve integral part of right sun gear 105. Planetary gears 103-3 and 103-4 are not clearly shown. Only one pin is shown labeled of pins 110-1 through 110-4, but all four pins tie carrier gears 109-1 and 109-2 together and support the planetary gears 103-1 through 103-4. A Variable #1 may be Left sun gear 107; a Variable #2 may be carrier gears 109-1, 109-2; and Variable #3 may be Right Sun Gear 105.

FIG. 1B (Prior Art) shows a section view "A-A" as FIG. 1(B)(1) and a section view "B-B" as FIG. 1(B)(3). A Front Side Cut View FIG. 1(B)(2) is intended to show the Perspective View of FIG. 1A using similar reference numerals. Carrier discs (gears) 109-1, 109-2 (FIG. 1A, FIG. 1(B)(1), FIG. 1(B)(2) and FIG. 1(B)(3)) which may operate as a variable control may rotate together in either rotational direction to control speed of variable input #1 from a left sun gear 107 to constant rotational output speed at variable #3, right sun gear 105. The left sun gear 107 may be turned by one of three variables: input, output and control. Together, the left or right sun gear 105, 107, the shaft 101 and the carrier gears or discs 109-1, 109-2 may provide six assignments of three variables, input, output and control. Two Transgear assemblies are combined to form a Hummingbird three variable control assembly first shown in FIG. 3.

FIGS. 1(B)(1) through 1(B)(3) show further details of a Transgear spur/helical gear assembly wherein, FIG. 1(B)(1) shows only one carrier disc 109-1 for simplicity as Section View "A-A". A second carrier disc 109-2 is shown in FIG. 1(B)(2) and in cross-sectional view FIG. 1(B)(3) as Section View "B-B". Arrow A of FIG. 1(B)(2) sections carrier disc 109-1 and arrow B sections carrier disc 109-2. FIG. 1(B)(1) taken together with FIG. 1(B)(2) shows the assembly of carrier discs 109-1, 109-2 and connecting pins 110-1, 110-2, 110-3 and 110-4 which carrier discs 109-1, 109-2 when taken together may be a control disc which can turn in either direction around support shaft 101. In FIG. 1(B)(2), left sun gear 107 may be seen meshing with planetary gear 103-2 which meshes with planetary gear 103-1, and right sun gear 105 may be seen meshing with planetary gear 103-4 which meshes with planetary gear 103-3.

FIG. 2A and FIG. 2B show in FIG. 2A a basic spur gear Transgear assembly and in FIG. 2B the ratios of left sun gear 210 L with a rotational speed ratio of 1 are given as L=2C−R and held at 1, carrier gears (C) 220 ratio per the equation C=(L+R)/2 and right sun gear (R) 230 rotations or number of revolutions ratio is given by the equation R=2C−L. When a ratio value is 0, it is intended that the identified gear, carrier or right sun gear is not rotating, braked or grounded.

FIGS. 2A and 2B shows a basic spur/helical gear assembly in FIG. 2A and, by adjusting gear ratios, the relative speeds of a left sun gear, a carrier gear and a right sun gear of the assembly may vary. Formulae or equations are for calculating rotational gear speed or number of revolutions ω where the carrier gears (C) may, for example, vary from 1, ½, ¼, ⅛ and 0 and the resultant rotational speed of the right sun gear (R) from +1 to −1 through 0, −½ and −¾ if the left sun gear (L) maintains at 1.

FIG. 3 shows how a Hummingbird control or speed converter is assembled from a first left Transgear assembly and a right Transgear assembly, each of which comprises a spur/helical gear assembly. A Transgear may apply its variables in six ways. A left sun gear 310 of a left Transgear assembly may, for example, be a control #1. A carrier gear 320 of the left Transgear may, for example, be a left output of the left Transgear which becomes the right control #2 shown as a top arrow which connects to carrier gears (discs) 350 of the right Transgear. At the bottom, a right sun gear 330 of the left Transgear may be left input #1 and connect to right input #1, left sun gear of right Transgear 340 as indicated by bottom arrow. The output of the Hummingbird control of FIG. 3 may be the right sun gear 360 of the right Transgear and be output #2.

FIG. 3 introduces left sun gear of left Transgear as gear 310 and shows relationships among the left and right Transgears. FIG. 3 is a complex Hummingbird control for use in a river turbine that is an assembly of two Transgear assemblies (left and right Transgears or spur/helical gear assemblies). For example, the Control #1 is left sun gear of left Transgear 310. The carrier gears of left Transgear 320 are shown as Output #1 becoming the Control #2 of the right Transgear or the carrier gears of the right Transgear. The right sun gear of the left Transgear 330 may be the Input #1 which becomes Input #2 to the left sun gear of the right Transgear 340. Finally, the right sun gear of the right Transgear 360 may be Output #2 of the right Transgear.

FIG. 3 thus shows how a complex Hummingbird control is assembled from a first left Transgear assembly and a right Transgear assembly, each of which comprises a spur/helical gear assembly. A Transgear may apply its input, output and control variables in six ways. A left sun gear 310 of a left Transgear assembly may be a Control #1. The depicted shafts of the two Transgears are not used for input. A carrier gear 320 of the left Transgear may be an Output #1 of the left Transgear which becomes the Control #2 shown as arrow 350 which connects to carrier gears (disc) of the right Transgear. At the bottom, a right sun gear 330 of the left Transgear may be Input #1 and connect to Input #2, left sun gear of right transgear 340. The output of the Hummingbird control of FIG. 3 may be the right sun gear of the right Transgear and be Output #2.

FIG. 4 shows a complete layout of a complex Hummingbird control which adds a connecting shaft 450 which connects the carriers of the left Transgear assembly of FIG. 3 to the carriers of the right Transgear (replacing arrow 350). FIG. 4 differs from FIG. 3 in regard to use of the shafts of the left and right Transgear assemblies. Input shaft 410 comprises a right sun gear of the left Transgear connected to or integral with the shaft 410 which extends into the right Transgear assembly. Also the left sun gear of the right Transgear is connected to or integral with the input shaft 410. So the complex Hummingbird as may be used in a river turbine may have an input variable, a control variable and an output variable or a total of three variables. The right sun gear of the left Transgear drives a planetary gear (top right) of the left carrier disc assembly. The Control left sun gear of the left Transgear meshes with a planetary gear (bottom left) of the left Transgear carrier disc assembly. The carrier of the left Transgear assembly meshes with the connecting gears and shaft 450 which connects the left and right Transgear carriers. The left sun gear of the right Transgear may connect to or be integral with the input shaft 410. This left sun gear of the right Transgear meshes with a planetary gear (bottom left) of the left carrier disc of the right Transgear. The planetary gear (top right) of the carrier of the right Transgear meshes with the right sun gear of the right Transgear which is the Output variable and comprises a sleeve having two sun gears—one at each end. In summary, the complex Hummingbird control with a connecting gear may comprise first and second Transgears (left and right) and may have three variables, an input, an output and a control. The Input is assigned to the shaft 410 and has two sun gears. The Control is a left sleeve of the left Transgear having two sun gears. The Output is a right sleeve of the right Transgear and may have two sun gears. Four planetary gears are shown two each of the left and right Transgear carrier assemblies.

FIG. 5 introduces the Hummingbird speed converter of FIG. 4 with the concept of releasing drive wherein a Hummingbird control module comprises first and second Transgear gear assemblies and shows how these may have components which rotate in different directions (CW is clockwise) and at different speed ratios (for example, ½ clockwise). FIG. 5 also introduces and shows FIG. 6(A) and the subsequent FIG. 6(B) how these may be simplified in FIG. 6(B) through FIG. 6(F).

Again, FIG. 5 shows the Hummingbird speed converter of FIG. 4 with the concept of releasing drive. CW represents clockwise rotation and CCW represents counterclockwise rotation. Variable input driving energy or power from river or tidal currents may be received by drive shaft 510 rotating CW. The output has a resistive load which typically comprises a generator of electricity. An object is to generate electric energy at constant power from a variable input. In order to demonstrate releasing drive, the output resistive load, (for example) a generator with a grid load is assumed to be held at 0 rpm because the generator cannot be turned by the input. A control dependent variable 520 comprising the left sun gear of the left Transgear rotating CCW turns the carrier planetary gear (bottom left) and the input right sun gear of the left Transgear turns the planetary gear (top right) as ½ clockwise rotation. Via the connecting gear and the left sun gear of the right Transgear, ½ CW is applied to the right Transgear carrier. When the resistive load is sufficiently high to create no output rotational speed, for example, the left sun gear of the left Transgear (the sleeve) will be driven and turn CCW. The driven control dependent variable 520 can be used as a control Input 510 to reduce the required power so the generator may then provide an output. In other words, the concept of releasing drive is shown.

FIGS. 6A-6F show the concept of simplifying a complex Hummingbird control in five steps shown starting with FIG. 6A which is identical in function to FIG. 5. By releasing in FIG. 5 is intended the concept of control gears turning in one direction and then in the other direction as necessary and in ratio when the incoming water energy exceeds that necessary to produce constant minimum power or, for example, in a tidal condition, must store excess power for later use when the tidal current is quiet. FIGS. 6(A) through 6(F) show how a complex Hummingbird speed converter, for example, similar to the dual Transgear assembly of FIG. 5 may be simplified into various embodiments. For example, FIG. 6(B) shows a reversal of the placement of the planetary gears of the right Transgear so the planetary gears (top) are proximate one another and the planetary gears (bottom) remain spaced from one another in the left and right Transgear assemblies. FIG. 6(C) shows elimination of the connecting gear seen in FIGS. 6(A) and 6(B). FIG. 6(D) shows a joining of the carrier pins of the left and right Transgears so as to be one carrier pin across left and right Transgears. FIG. 6(E) shows elimination of the right carrier disc of the left Transgear and the left carrier disc of the right Transgear so that the planetary gears (top) are joined to form a single planetary gear and the left an right sun gears of the input shaft are combined as a single sun gear at the center of the Hummingbird control assembly embodiment. FIG. 6(F) shows a simplified Hummingbird of FIG. 6(E) where any spaces between planetary gears is removed to form a more compact assembly than FIG. 6(E). FIG. 6(F) shows a preferred simplified Hummingbird control embodiment having an input, a control and an output variable.

FIG. 7 shows a simplified Hummingbird control 700 comprising a balanced three variable system (input torque=control torque=output torque) of Input Power $P_1=\tau_1$ $\omega_1$ provided to input shaft 710 having a central (unnumbered middle) sun gear for input power 710, left control sleeve 720 (which may be referred to herein as an extension disc/sleeve/sun gear) for control power 720 and right output sleeve 740 (which may be referred to herein as a sun gear/sleeve/extension disc) for output power 740. The unnumbered middle sun gear meshes with planetary gear 730-1. Planetary Gear 730-2 meshes with left control power input 720, extension disc/sleeve/sun gear, which surrounds the input shaft 710. Planetary Gear 730-3 meshes with right output power sun disc/sleeve/extension disc. Planetary gear 730-1 supported by a first unnumbered pin of carrier discs is wider than either planetary gear 730-2 or 730-3 supported by a second opposite pin of first and second unnumbered carrier discs. Planetary gear 730-1 and 730-2, 730-3 width is measured in the direction of one of the first and the second unnumbered supporting pin of the carrier discs. Power as introduced above is the product of torque i and rotational speed co where the object is to harness as much power as possible from a river current which may be in one direction or be tidal in two directions; see FIGS. 13A and 13B for two directions of water flow and FIG. 14B for one direction, right to left). Input torque from the harnessing module (for example, waterwheels 1315, 1330 of FIGS. 13A and 13B) may be preferably equal to control torque which may be equal to output torque to balance the three variable system of a simplified Hummingbird control 700. FIG. 7 shows the concept of balancing a three variable system using the simplified Hummingbird control of FIG. 6(F) as the operable, exemplary embodiment. Torque $\tau$ is defined as the concept of harnessing a force, for example, from river current flow that operates on a moment arm to generate, for example, foot pounds of torque. Torque in regard to a rotating input shaft 710 driven by a harnessing module will rotate at a rotational velocity co which when multiplied by torque results in energy or power. An object is to harness or collect river or tidal current flow power and convert it to electrical energy as Output Power 740. All three torques (input, output and control) must be equal to balance the Hummingbird control system 700. Input power 710 harnessed by a harnessing module (not shown) and delivered to a simplified Hummingbird 700 at input shaft 710 is given by the equation $\tau_1 \omega_1$. Isolating the input torque $\tau_1$, we arrive at the equation Input Power (harnessed from a river) divided by the input shaft rotational speed in revolutions per minute $\omega_1$ for $\tau_1$. The torque values $\tau_1$, $\tau_2$ and $\tau_3$ can be kept unchanged or equal and balanced if the three values of power divided by the rotational speed in rpm or $\omega$ are equal. Input, control and output torque can be increased or decreased at the same ratio and still be equal in a balanced system. An objective is to increase the output power $P_3$ and decrease the control power $P_2$ so that as much input power $P_1$ from a harnessing module is harnessed as output power $P_3$ as possible. Torque and power are independent variables and rpm or rotational speed $\omega$ is dependent on river flow rate. Thus, as explained herein, the depth of a river and its speed or flow rate are important variables for choosing location of a river turbine for maximizing output power. As will be demonstrated herein the ratio of output power to control power may be, for example, ten to one. FIG. 7 shows input shaft 710 having a central (unnumbered middle) sun gear, left sleeve (control power 720 extension disc/sleeve/sun gear) and first and second sun gears 720 (the first sun gear being the extension disc) which provides control power and resultant torque and right sleeve (output power 740 sun gear/sleeve/extension disc having third and fourth sun gears 740 (the fourth sun gear being an extension disc) for providing output power and output torque. As already suggested, $\tau_1$ may equal $\tau_2$ which may equal $\tau_3$ to balance the system. Also shown are planetary gears 730-1, 730-2 and 730-3 of opposite unnumbered pins connecting the carrier discs where planetary gear 730-1 is wider, measured in the direction of its supporting pin, than either width of planetary gears 730-2 or 730-3 measured in the direction of their supporting pin. FIG. 8 is a mechanical design layout of more of the elements than are shown in FIG. 7 that may be coupled to the input, control and output of a simplified Hummingbird control 800 and the projected power in relation to torque and rotational speed. Simplified Hummingbird 800 in this embodiment compared with that of FIG. 7 has three unnumbered gear boxes for connecting Variable Input 850 (perhaps a magnetic gearbox) to an input shaft sun gear integral with MSG 840, for connecting Control Input 810 to LSG 820 and for connecting Output 860 to RSG 830. Both unnumbered left and right planetary gears are supported by the same unnumbered pin connecting the unnumbered first and second carrier discs, and unnumbered wide planetary gear meshed with MSG 840 is supported by the same pin connecting the first and second carrier discs where width of planetary gears is measured in the direction of unnumbered supporting pins connecting unnumbered carrier discs. Variable Input is 850 to a gear box (unnumbered comprising split gears or a magnetic gearbox) from a harnessing module (not shown) whose design should be selected with reference to river parameters such as depth and water current flow speed where Variable Input power 850 is greater than or equals 28.125 (64$\tau$). Control Input power 810 is the constant output power of a control motor, not shown, and is given by 1800$\tau$ in this example. Output 860 is the projected output power of 1800($\tau$) at constant frequency such as 60 Hz US of a generator connected at 860. Output 860 rotational speed is received from an unnumbered output shaft having a sun gear connected to a gear box of two split gears, one being meshed with extension disc/sleeve/sun gear (RSG 830). Thus, FIG. 8 shows a design layout for balancing a three variable simplified Hummingbird control system 800 further including, for example, a control motor, not shown (at Control Input 810) operating at, for example, 1800$\tau$ power, operating via a control shaft having a right sun gear of Control Input shaft 810 connected via the right sun gear to a gear box of first and second split gears and a sleeve (left extension disc/sleeve/sun gear) of the input shaft being meshed at right via a gear box to Output 860 and at left meshed with a LSG or left sun gear 820 (the sun gear of unnumbered left extension disc/sleeve/sun gear) at 225 (8$\tau$) power. The input Variable Input 850 from, for example, a harnessing module via a left gear box preferably has a power rating greater than or equal to 28.125 (64$\tau$) so that there is sufficient power with a generator load of a constant 1800$\tau$. A RSG or right sun gear 830 of a sleeve (unnumbered right sun gear/sleeve/extension disc) connects via a gearbox to an output 860. Right sun gear 830 is opposite the left sun gear LSG 820 of a sleeve (left sun gear/sleeve/extension disc) surrounding a central shaft having a central (middle) sun gear (MSG) 840. Right sun gear (RSG) 830 may operate at greater than or equal to 225 (8$\tau$) power. The left sun gear LSG 820 and right sun gear RSG 830 operate at 225 (8$\tau$) power or 1800$\tau$ in a balanced torque system. The MSG or middle sun gear 840 of the simplified Hummingbird 800 has a power value of greater than or equal to 225 (8$\tau$) and so is variable with harnessed river current flow Variable Input being greater than or equal to 28.125 (64 $\tau$). The output is constant and Output 860 may be taken from a right gearbox to a generator load at 1800($\tau$) and output 60 Hz frequency in the US (or designed to output 50 Hz) in Europe. Balancing torque means that the control power (Control Input) 810 may equal the output power (Output) 860 or 1800($\tau$). However, if the control power is equal the output power, then, there is effectively no harnessed power. All the harnessed power is utilized for control, but the system has balanced torque.

FIG. 9 shows a layout of releasing drive where the waterwheel input exceeds or equals the generator output. A preferred option is to regulate control power at a ratio of 10/1. This is shown by adding a worm and pinion (W&P) at 10/1 at 920. Referring to FIG. 9, the power efficiency by utilizing less control power is approximately 10% as will be further explained below.

FIG. 9 adds a control motor input 910 via a worm and shaft to simplified Hummingbird 900 having, for example, a control motor power input 910 of 1725($\tau$/10) via worm and pinion 920 operating at 10/1 ratio and power 172.5($\tau$). FIG. 9 is a design layout of a releasing drive where the worm and pinion from a control motor (not shown) may be a lock and a one way drive. The Gear Ratio 925 output by a sun gear may be 30/23 and is meshed with a left sun gear of a left sleeve of the simplified Hummingbird 900 shown as having a power 940 of −172.5 (30/23)($\tau$) which is −225($\tau$). The harnessing module or Waterwheel Input is fed to a gear box via a shaft at a variable harnessed power greater than or equal to 28.125 (64$\tau$). The shaft of the simplified Hummingbird 900 is shown having a power greater than or equal to (225) (8$\tau$). The right sleeve and sun gear of the simplified Hummingbird 960 is seen as having a power rating of −225(8$\tau$). The output to the generator 970 is constant and is related to the right gear box and calculated at 225 (8) (8$\tau$/8) which is 1800$\tau$ which is the electrical load value of the generator (not shown). The Power Ratio is equal to P(Control) 910/P(Output) or (Produced) (or generated) 970=1725 ($\tau$/10)/1800($\tau$)=1.0/10.434782. The Power Efficiency=P (Used)/P(Produced)=1.0/10.434782 or 9.58333%. The waterwheel input is greater than or equal to 28.125 (64$\tau$) or greater than 1800$\tau$. So, the constant output power of the generator is also 1800$\tau$ and the harnessed power is greater than or equal to the power generated by the load generator. The worm and pinion 920 operates as a lock or as a one way drive for the river turbine and FIG. 9 is an exemplary design layout of a releasing drive.

FIG. 10 is similar to FIG. 9 in layout with a simplified Hummingbird 1000 surrounded by river turbine components. FIG. 10 shows a grid-tied river turbine (where current flow is in one direction to a harnessing module, not shown, but input at 1010) where the grid 1020 provides power under control of a central processing unit 1030 to control an AC synchronous control motor 1035 at 1725($\tau$/10). The control motor 1035 turns worm and pinion gears 1045 at a ratio of 10/1 and results in power 1045 of 172.5$\tau$ (1725($\tau$/10) calculated). The gear ratio 1040 from W&P 1045 is 30/23 in this design. Thus, FIG. 10 shows a further embodiment of a simplified Hummingbird 1000 connected to an Input Power 1010 harnessing module (not shown) and outputting harnessed collected energy to a generator 1055 to a grid 1060 which has an AC synchronous control motor 1035 that may use some power controlled by a central processing unit 1030 taken from the grid 1020 to operate the AC synchronous control motor 1035 for turning worm and pinion control 1045. The gear ratio 1040 may be 30/23 and translates at a left sleeve and sun gear of the Hummingbird 900 at 1070 to −225 (23/30)($\tau$). So, FIG. 10 is similar to FIG. 9 in the power value figures shown but takes power from the grid 1020 to operate the control motor 1035 operating worm and pinion gear control gears 1045. Harnessed input power from a harnessing module (not shown) is received as Input Power 1010 at an input shaft of a left gear box. The input power 1010 is greater than or equal to 28.125 (64$\tau$) which is equivalent to any of the power values below: greater than or equal to 1800$\tau$; 900 (2$\tau$); 450 (4$\tau$); 225 (8$\tau$); 112.5 (16$\tau$) and so on to 28.125 (64$\tau$). In this grid-tied river turbine where there is assumed to be river current flow in one direction at the location of the river turbine, Input power 1010 is received at a gear box which may be a magnetic gear box so as to permit slippage in heavy water flow conditions. The left or input gear box feeds variable power to simplified Hummingbird control shaft at 1050 at greater than or equal to 225 (8$\tau$). Control is provided as follows. Grid power 1020 may be controlled by central processing unit 1030 to power AC synchronous control motor at a constant 1725($\tau$/10). This is delivered to worm and pinion gear system at 10/1 for outputting 172.5($\tau$) at shaft 1045 having a gear ratio with an integral or connected sun gear at a gear ratio 1040 of 30/23. The sun gear is meshed with a Hummingbird left sleeve having a sun gear. To the right, the harnessed power greater than or equal to 225 (8$\tau$) at 1050 turns the central sun gear of the simplified Hummingbird 1000 and a constant power output is delivered to a right gear box via a shaft to a generator 1055 having a constant load of 1800$\tau$ at, for example, 60 Hz at grid 1060. The Power Ratio/Efficiency is given as P(Used)/P(Generated)=1725($\tau$/10)/1800($\tau$) =0.095833 or the Power Used by the control motor or by the generator is less than 10%. The input power from the harnessing module, not shown, input at 1010 must be greater than or equal to 18.125 (64$\tau$) which calculates to greater than or equal to 1800$\tau$, the constant output of generator 1055 to grid 1060. In a prototype product, the output power may be 25 kW for providing emergency power to a small village of an undeveloped country.

Further variations, for example, DC control in FIG. 11 and assembly of a floating platform design in FIGS. 12A and 12B are shown and discussed below designed by taking river flow harnessing module measurements of rotational speed per FIG. 12C to obtain a constant frequency output of 60 Herz. A layout of an rpm balanced Hummingbird is discussed in FIG. 12D. Tidal turbines with bi-directional current flow are discussed in FIGS. 13A and 13B. Location of a further tidal turbine embodiment are described in FIG. 14(A) through 14(B) (trap door controlled). Pascal and Han's principles related to minimal loss of power and balancing torque in a closed system are discussed with reference to FIGS. 15, 16 and 17. Now, FIG. 11 will be described comprising a DC design.

FIG. 11 provides an example of a stand-alone river turbine (river flow in one direction) which does not take power from the grid but rather delivers power to a micro-grid requiring variable load control. FIG. 11 demonstrates direct current control power that is tapped from the output of generator 1155. FIG. 11 shows micro-grids 1162, 1164 having a CPU controlled DC voltage regulator 1175 and a generator 1155 which may operate with a variable load 1180 and a compensatory load 1185, each represented as a variac. A variac or rheostat may be controlled by a servo motor (not shown). A DC battery 1130 may store excess power and power a DC control motor 1135 at constant power 1725($\tau$/10) from power delivered via constant power generator 1155 rated at a constant value of 1800($\tau$) (where $\tau$ is effective torque of a harnessing module, not shown) and releasing power (or storing excess power) where releasing is used with the definition of turning in one direction or the other via a worm and pinion gear 1145 having a power at 172.5($\tau$) (equivalent to 1725($\tau$/10) and a worm and pinion (W and P) ratio of 10/1. First, the input from a harnessing module providing a variable but sufficient power input is shown quantified at 1115 to be greater than or equal to 28.125 (64τ) input via a gear box to simplified Hummingbird 1100. This value is shown below as various multiples of rotational speed and torque. Worm and pinion 1145 may be at 10/1 and output −172.51 at 1145. As above a gear ratio of a control gear may be 30/23 resulting in an input control of −225 (23/30)(τ) at 1170. Central shaft 1150 of simplified Hummingbird 1100 delivers greater than or equal to 225 (8τ) to an output gearbox (or 2000τ) which is controlled to a constant 1800(τ) at generator 1155. A right sleeve and sun gears 1165 the power value is −225 (8τ) as in FIG. 10. To the right, the harnessed power greater than or equal to 225 (8τ) at 1150 turns the central sun gear of the simplified Hummingbird 1100 and a constant power output is delivered to a right gear box via a shaft to a generator 1150 having a constant load of 1800τ at, for example, 60 Hz at generator 1155 to microgrids 1162, 1164. The Power Ratio/Efficiency is given as P(Used)/P(Generated)=1725(τ/10)/1800(τ)=0.095833 or the Power Used by the DC control motor or by the generator is less than 10%.

The concept of releasing is exemplified as follows: 1) the generator is assumed to be a load; 2) the load helps the control input to release or store excess input; 3) a set of worm and pinion gears is a one way control; 4) Releasing or storing excess input rotation by a control motor with the set of worm and pinion gears required less torque than input; 5) the input torque does not change when released or stored; 6) the design of FIG. 9 may be completed as a constant output product and 7) required controls are a variable load control (the generator) and grid connector control.

FIGS. 12A and 12B show assembly of a river turbine where the X axis represents the axis of water flow, the Y axis is orthogonal and horizontal and the Z axis is vertical and orthogonal to the X and Y axis. FIG. 12A represents a front view and FIG. 12B represents a side view. FIG. 12A shows a floating platform for carrying a simplified Hummingbird, a control motor 1235, a generator 1255 and chains and sprockets 1289 better seen in FIG. 12B, side view. The floating platform 1250 floats because it may be floated on pontoons 1202A and 1202B and should be balanced so that it does not tip with river flow and may be anchored to the river bottom or doubly anchored so that it does not sway with the current. One example of a harnessing module is shown that may comprise multiple, for example, from six to eight concentric wings (eight shown surrounding shaft 1220D operating as a propeller harnessing module (wings 1220A-1220C and 1220E through 1220I). The larger and deeper the river and the faster the current flow, the more water energy ω τ that may be harnessed for generating electricity as per the power concept of torque times rotational speed in rpm where the rotational speed of the paddle wheel is variable as is the torque produced by the river current flow operating on the paddles. The harnessing module may have a tail (like a windmill) and be mounted so it may rotate with the river current and further operate on a variable axis and more closely match the water flow direction. Magnetic coupling of the harnessing module to the simplified Hummingbird is useful in times of turbulent currents to permit the magnetic coupling to slip. A variable overlap generator or VOG may be used, multiple generators may be used and the platform 1205 may be self-driven.

Referring to FIG. 12B, protector bars may protect the harnessing module from floating debris or debris that is below the surface of the water but carried by the river current. The protector bars 1290 are intended to protect the harnessing module. The water flows past the protector liars and meets the harnessing module which turns and generates torque and rotational speed (collected energy). It is preferable as discussed above, if the collected water energy exceeds the constant power output expected to be delivered by an output generator 1255. If the X axis is the water flow axis and is variable, it is intended that the chain and sprockets 1289 be adapted to move with the current and allow the harnessing module to sway slightly matching the current flow direction of the X axis. In a preferred embodiment, the river turbine assembly is designed to deliver a minimum of 25 kW of power which is sufficient to provide electric lights at night or run emergency equipment such as a water pump or provide basic necessities to a small riverside community (for example, of an undeveloped country).

FIG. 12C shows actual experimental data collected on the Winnipeg river in Canada over a thirteen hour period of a day where the river speed's rotation of a waterwheel as measured at the harnessing module (waterwheel) by a speed tachometer varied from thirty-eight to fifty-five rpm showing over time a difference of seventeen rpm or a 44.7% variation or increase in rotational speed (bottom of chart: Variable River Speed). On the other hand, a test platform including a load and a Hummingbird control system provided a Turbine output between 1801.4 and 1803.6 rpm or equivalent to an electrical frequency of 60.083 Hz plus or minus 0.036—vary stable electrical frequency output despite the variation in waterwheel rpm input.

FIG. 12D shows a figure of a layout of an rpm balanced Hummingbird with dimension ratios shown, for example: control motor (4) at 3600 rpm was at 3.000 and dimension of gear at 3.000; left sun gear ratio (3) was at 3.000 to 5.000 or the rotational speed is calculated at 3600 $(3/5)^2$ or 1296 rpm; right sun gear (2) was at 6.0000 to 4.0000 or 1800 (4/6) or 1200 rpm; turbine (6) was at 90 rpm; carrier gears (5) of the Hummingbird were at 90 $(5/3)^5$ (2) or 2314 rpm and generator (1) output was at 1800 rpm or 60 Hz. A simplified Hummingbird is shown in the circle.

Applicant has had Pascal's principle of a balanced hydraulic system at the back of his mind. Pascal's principle, also called Pascal's law, in fluid (gas or liquid) mechanics, stales that, in a fluid at rest in a closed container, a pressure change in one part is transmitted without loss to every portion of the fluid and to the walls of the closed container. Force is pressure multiplied by area and to balance pressure, pressure is force divided by area so that if a force is ten times an original force, it is translated without loss as new force is ten times the original force depending on the original and other area to which the force is translated, for example, ten times the area to which the force is directed (with no loss).

A new principle evolved (which may be referred to as Han's principle) is that, in rotary motion mechanics and a closed mechanical system such as a Hummingbird, a three variable control system, a torque change in one variable is transmitted to other variables without major power loss in the system. This principle has been demonstrated on the Winnipeg river in Canada in a trial.

First, a harnessing module w ill be described to maximize harnessed renewable energy from the flow of water and then Han's principle will lie described with respect to the control module and generating module representing a closed mechanical system where the closed Hummingbird control system has three variables.

FIGS. 13A and 13B show bi-directional river or tidal current capture by a harnessing module 1330 covered by a hatch 1310 which may move 180 degrees to either capture current flow from the right in FIG. 13A or from the left in FIG. 13B (motor for moving hatch not shown). In either case (water flow from the right or from the left), the harnessing module comprising six to eight water collectors or paddles mounted spatially separated around a shaft 1315 (waterwheel 1330) will always rotate in a counter clockwise direction, and so any harnessed energy may drive a generator (not shown) or be stored for periods of tidal change (battery not shown). The hatch position may match the changing tides which are dependent on a known schedule of high and low tide peaks throughout a year and so the hatch 1320 position with respect to the waterwheel 1330 permits delivery of power by a generator Hummingbird (not shown) or a Hummingbird control motor (not shown) or other embodiment of a tidal turbine. A paddle 1340 may help keep the platform in line with the current flow (from the left or right) and may be moved with the tide change.

FIGS. 14(A) and 14(B) are intended to describe the design of a waterwheel or other harnessing module embodiment with respect to a load (such as a generator not shown) and a choice of a location on a river or tidal estuary.

FIGS. 14A and 14B are intended to describe the design of a waterwheel or other harnessing module embodiment with respect to a load (such as a generator not shown) and a choice of a location on a river or tidal estuary. Referring to FIG. 14(B), there is shown in side view a typical waterwheel which if driven sufficiently by river or tidal water flow will turn the load (tor example, the generator) and output electric energy. The waterwheel must be designed in consideration of torque $\tau$ and rotational speed $\omega$ I view of the particular water location chosen for the harnessing module. Torque is related to the active variables of radius of the waterwheel spoke members (eight paddles or buckets or other members) which reach from the shaft to the location along the X axis from the shaft where river current flow creates force at the moment arm of the members and so creates torque and rotational speed when the wheel turns. In the case of the depicted waterwheel, the torque is given by half the radius to the semi-circular buckets which catch water, and the force is the force exerted against the buckets or paddles or other members of a harnessing module by the current flow. The product of moment arm and water flow force yields torque. Consequently, the torque caused by the rate of river current flow may cause the waterwheel to turn and drive the generator at a rotational speed to which may vary. The higher the rotational speed and the torque, the higher the captured energy from the river flow. The river front view drawing of FIG. 14A shows a wide river portion which may be shallow and slow—it is best to pick a river location that is deep and has a fast water flow current to create rotational speed of the waterwheel. A river portion may be deep and have a high-speed current flow which is more ideal as a waterwheel location. Consequently, position on a river has an impact on harnessed energy so that the moment arms may be long and the various means to harness water energy are efficient, force is high and rotational speed of the waterwheel will vary as per FIG. 12C, for example. A given floating platform may comprise first and second waterwheels in series or in parallel to, for example, multiply the harnessed water flow energy by two. As suggested above, the waterwheel must be designed to develop at least a level of $\omega\tau$ to equal the load, for example, a twenty-five kilowatt generator. FIG. 14B shows a tidal flow in both directions where water flow from the left moves through the lower portion of the water wheel to a closable flap which is open when water flows from the left. The opposite happens when water flows from the right. Water flows past the stationary bar and flows through the moveable flap at the right via the top of the waterwheel. The waterwheel always turns counterclockwise in this example. At low tide, the tidal estuary may have no water and so no depth. It is important that a tidal estuary have depth at low tide as well as at high tide so that a waterwheel will not sink into the mud of the bottom of a tidal estuary. Ideally, positioning should be close to the ocean so that there is always water in the estuary at a sufficient depth, and also the tidal water flow can have some current flow in one direction or the other and sufficient depth at all hours of the day, even at low or high tide. As above, the X axis represents the direction of water flow, the Y axis represents the direction of the waterwheel shaft and the Z axis is vertical and is the direction toward a platform, labeled in FIG. 14B. In short, the harnessing module should be specifically designed for a specific location on a river or tidal estuary.

FIG. 15 shows Han's principle of a closed mechanical system and a principle of no or little harnessed energy loss through a twenty-four hour period of river current flow. A cross-sectional view of a complex Hummingbird control design 1500 is shown with a harnessing module 1510 (not shown) connected at left that generates $P_1 = \tau_1 \omega_1$ worth of power. In terms of torque and from experimental results at a given river location over time with a load, $\tau_1$ (shown as being applied to the central shall of the Hummingbird 1500 must be greater than or equal to $P_1/\omega_1$ where $\omega_1$ is the rotational speed of the waterwheel with a load of the controlling module (the Hummingbird) and the generating module. The controlling module 1520 is shown as left sun gear/sleeve where a second control torque $\tau_2$ is shown where the power P is the power of the control motor (not shown) and the rotational speed is constant $\omega_2$. The generating module 1530 is shown at right sun gear/sleeve where the generated power is $P_3 = \tau_3 \omega_3$. In this example, $P_3$=approximately 10 $P_2$ such that very little power (about 10%) of the controlling module power is lost by the controlling module. FIG. 15(A) also shows equation (a) 1540 where the principle of balancing torque is shown in the following form: $\tau_1$ (Harnessing Module)=>$\tau_2$ (Controlling Module)=$\tau_3$ (Generating Module).

The process of designing a suitable harnessing module to achieve a minimum constant amount of power has been explained. In a river or tidal estuary trial, the design of the waterwheel which may be located below a floating pontoon may take days, months or a year or may require at least data collected on the river or tidal estuary over a period of a year or more, for example, to pick appropriate locations and measure minimum depth and river flow/waterwheel speed calculations over time (per FIG. 12C) to see how large the waterwheel may be to maximize torque and speed, how many waterwheels may be used in parallel (or in series) as necessary and how efficient the waterwheels may be at generating torque defined as force from the water flow at a radius from the shaft to generate torque measured at a torque sensor (not shown) for each module of the Hummingbird. A tachometer may be used in combination with a harnessing module, controlling module and generating module to measure rpm at full load. The control, generator and other equipment may be mounted on a pontoon with the harnessing module underneath which pontoon may be anchored to the river bottom or sides.

FIG. 16 shows a Torque balanced river turbine showing connections to a simplified Hummingbird control 1600. The harnessing module 1610 receives torque via a gearbox and, per this design, $\tau_1$ is greater than or=to $P_1/\omega_1$ which is the waterwheel speed. The torque (turbine) is greater than or equal to (3.125/8)/28.125 where 28.125 is 225/8. At the controlling module 1620 (typically a constant speed motor, not shown), $\tau_2=3.125$ kW/225 rpm. At the generating module 1630, the same result is found in a balanced torque river turbine or $\tau_3=(25/8)/(1800/8)$ or 3.125 kW/225. The Power ratio 1650 is given by P(Generator)/P(Control Motor)=25/ (25/8)=8/1. The power lost to the load which may include the control motor and the generator load is just 12.5% in this balanced mechanical system. In this case, per Han's principle 1640, $\tau_1$ is greater than or equal to $\tau_2=\tau_3$ in a balanced system.

FIG. 17 comprises a further figure of a torque balanced river turbine having a simplified Hummingbird control 1700. Turbine 1710 has an energy or power P load of greater than or equal to 0.39 kW. The torque on the central sun gear 1720 of the Hummingbird is $\tau=P/\omega$ or 3.125/225 or 0.0138. The control motor 1739 has the same torque as the central sun gear or 0.0138 as does the generator 1740 at 0.0138. Again, the power ratio of the generator divided by the control motor is 25/3.125 or 8/1 meaning the control motor only represents 1/8 of the power of the generator and load or harnessed energy through the closed mechanical system according to Han's principle.

The principles of application of the several discussed embodiments of a structure and method of constructing same for, for example, providing a green renewable energy alternative to the burning of fuel such as coal, oil or other less environmentally friendly energy sources have been demonstrated above comprising a harnessing module specially designed and located to produce at least a predetermined value of harnessed renewable energy to produce a constant amount of power to a load. A controlling module may use a pair of spur/helical gear assemblies of sun gears and planetary gears constructed as a three variable control of variable rotational speed (a Hummingbird) and an accompanying control motor or control assembly used to convert rotational harnessing module speed variation to constant frequency, for example, for use in a river or tidal MHK turbine electric power generator. The present embodiments used in conjunction with known flow energy turbine systems may be enhanced by using many known control systems for improved operation such as pitch and yaw control in wind turbines which are adaptable for use as propeller-driven river turbine harnessing modules, control responsive to power grid statistics and requirements and remote or automatic control responsive to predicted and actual weather conditions (river velocity from weather forecasts, an anemometer, water flow velocity from a water flow velocity meter, torque control via a torque meter, barometric reading and direction (rising or falling) and the like). A three variable to constant speed converter may be of the Goldfinch or preferably a simplified Hummingbird type and include a constant speed motor for controlling the output speed at a constant (constant frequency in Hertz) along with use of a variable power generator in certain of these embodiments. Besides river and tidal water energy uses, applications of a Hummingbird control may also be found in the fields of combustion or electric vehicles or boats, pumps and compressor. These and other features of embodiments and aspects of a variable energy flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A control gear assembly for controlling variable rotational speed input to the control gear assembly to be greater than or equal to a constant rotational speed output of the control gear assembly, the control gear assembly for outputting a predetermined value of renewable electric energy, the control gear assembly comprising:

a renewable energy harnessing module designed to harness renewable energy from the flow of water current, the renewable energy harnessing module requiring a depth of water and a speed of water to capture the predetermined value of electric energy for delivery to a load, a renewable energy harnessing module input shaft from the renewable energy harnessing module, the renewable energy harnessing module being designed for a specific location on a river or a tidal estuary, the renewable energy module input shaft for receiving the variable rotational speed input, the variable rotational speed input received from the renewable energy harnessing module for delivery via a renewable energy harnessing module gearbox to a first sun gear and a second middle sun gear of a simplified spur gear assembly input shaft, the simplified spur gear assembly input shaft having the first sun gear and the second middle sun gear, the second middle sun gear meshing with a first wide planetary gear of a first pin connecting first and second carrier discs of a simplified spur gear assembly, the first wide planetary gear of the first pin having a width greater than widths of either of third and fourth planetary gears of a second pin opposite the first pin, the first and second pins connecting the first and second carrier discs, width of the first, second and third planetary gears being measured in a direction of the first and second pins, a carrier and pin assembly of the simplified spur gear assembly including the first and second carrier discs, the first pin supporting the first wide planetary gear meshed with the middle sun gear of the simplified spur gear assembly input shaft having the first sun gear and the middle sun gear, and the second pin opposite the first pin supporting the third and fourth planetary gears, the second pin supporting the third and fourth planetary gears being opposite the first pin supporting the first wide planetary gear, a sun gear/sleeve/extension disc surrounding the simplified spur gear assembly input shaft having the first sun gear and the middle sun gear, the sun gear/sleeve/ extension disc located at an output of the simplified spur gear assembly and an extension disc/sleeve/sun gear surrounding the simplified spur gear assembly input shaft having the first and the middle sun gear at a control motor input of the simplified spur gear assembly, the sun gear/sleeve/extension disc meshing with an output gear box providing an output via an output shaft, extension disc/sleeve/sun gear receiving a constant rotational speed control input via a control motor input shaft from a control motor through a gearbox providing the control motor input, the output shaft connected to a generator for outputting the predetermined value of renewable electric energy to a load.

2. The control gear assembly as recited in claim 1 wherein a control motor input of the control motor to the simplified spur gear assembly utilizes less renewable electric energy than the predetermined value of renewable electric energy delivered to the load.

3. The control gear assembly as recited in claim 2 wherein the renewable energy harnessing module comprises between six and eight concentric wings operating as a propeller harnessing module surrounding a harnessing module shaft.

4. The control assembly of claim 3 wherein electric power used by the control motor and by the generator is less than ten percent of generated electric power.

5. The control gear assembly as recited in claim 1 wherein the renewable energy harnessing module comprises a waterwheel for capturing river renewable energy, the waterwheel having between six and eight spokes having a radius from a central shaft, the spokes for supporting one of a paddle, a bucket and a propeller blade for receiving water current flow and generating torque to turn the central shaft at a variable rotational speed for generating the predetermined value of electric renewable energy, the waterwheel further comprising a hatch moveable one hundred eighty degrees for capturing river renewable energy from bi-directional river flow.

6. The control gear assembly as recited in claim 1 wherein the renewable energy harnessing module comprises a waterwheel for capturing bidirectional water flow renewable energy, the waterwheel having first and second trap doors and first and second protector bars, a first trap door and protector bar permitting water flow to turn the waterwheel from a first direction and a second trap door and protector bar permitting water flow to turn the waterwheel from the second opposite direction.

7. The control gear assembly as recited in claim 1 wherein the renewable energy harnessing module is coupled to the renewable energy harnessing module gear box comprising a magnetic gear box.

8. The control gear assembly as recited in claim 1, the renewable energy harnessing module comprising a waterwheel, the waterwheel capable of receiving river water flow from two opposite directions and, via one of a 180° rotational movement of a hatch about the waterwheel and of a movement of first and second trap doors by the received river water flow, the waterwheel rotating in the same direction regardless of the direction of river water flow.

9. The control gear assembly as recited in claim 1 wherein the control gear assembly provides a constant output power to the generator for generating electricity at constant frequency and the renewable energy harnessing module is designed to output a predetermined minimum value of power.

10. A control gear assembly for use as a river turbine, the control gear assembly for controlling variable rotational speed input such that an output of the control gear assembly provides a constant speed output from a minimum variable rotational speed input, the control gear assembly comprising a three variable system, the three variable system comprising:

an input shaft connected to a water energy harnessing module, the input shaft for receiving a minimum variable water current rotational speed and direction input from a renewable water energy harnessing module, the input shaft having a first middle sun gear of the control gear assembly, the middle sun gear meshing with a first wide planetary gear, the first wide planetary gear having a width greater than a second planetary gear and a third planetary gear of a first pin connecting first and second carrier discs of the control gear assembly, the first wide planetary gear of a second pin connecting first and second carrier discs having a width greater than the second and third planetary gears of the first pin connecting the first and second carrier discs, width of the first wide, second and third planetary gears being measured in a direction of the first and second pins connecting the first and second carrier discs, a sun gear extension disc/sleeve/sun gear surrounding the input shaft of the control gear assembly and meshing with the second planetary gear of the first pin connecting the first and second carrier discs, the sun gear extension disc/sleeve/sun gear receiving rotational speed of a control motor as a control input, a sun gear/sleeve/sun gear extension disc of the control gear assembly surrounding the input shaft of the control gear assembly and meshing with the third planetary gear of the first pin connecting the first and second carrier discs, the sun gear/sleeve/sun gear extension disc outputting rotational speed to a generator for outputting electric power to a generator load.

11. The control gear assembly as recited in claim 10 wherein a constant rotational speed is received at the sun gear extension disc/sleeve/sun gear from the control motor as the control input.

12. The control gear assembly as recited in claim 10 further comprising a releasing of drive comprising the control motor input via a worm and pinion for regulating control input power.

13. The control gear assembly as recited in claim 12, wherein the control motor being one of direct current and AC synchronous provides a constant power control input.

14. The control gear assembly as recited in claim 12 having a DC voltage regulator connected to the generator, the generator connected via a gear box to the sun gear extension disc/sleeve/sun gear, the DC voltage regulator for outputting power to one of a DC control motor and a battery.

15. The control gear assembly as recited in claim 10 wherein the renewable water energy harnessing module comprises a propeller comprising between six and eight concentric wings for capturing water current flow renewable energy, the propeller for generating a torque τ and rotating at a rotational speed ω of a minimum value depending on the output power to be generated by the control gear assembly driving the generator.

16. The control gear assembly as recited in claim 10 wherein the renewable water energy harnessing module comprises one of a waterwheel and a propeller for capturing water renewable energy, the waterwheel or propeller rotating in the same direction but having one of a hatch and paddle and of first and second protector bars and first and second trap doors for receiving water flow from one of two directions of water flow.

17. The control gear assembly as recited in claim 10 wherein a gear box comprising a magnetic gear box connects the renewable water energy harnessing module to the control gear assembly.

* * * * *